US012688951B2

(12) United States Patent
Hume et al.

(10) Patent No.: US 12,688,951 B2
(45) Date of Patent: Jul. 21, 2026

(54) RETAINING FIXTURES AND SYSTEMS FOR MAKING WIRE HARNESSES

(71) Applicant: The Boeing Company, Chicago, IL (US)

(72) Inventors: Darcy Michelle Hume, St. Augustine, FL (US); Ty Aaby Larsen, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 948 days.

(21) Appl. No.: 17/734,440

(22) Filed: May 2, 2022

(65) Prior Publication Data

US 2022/0406492 A1 Dec. 22, 2022

Related U.S. Application Data

(60) Provisional application No. 63/212,215, filed on Jun. 18, 2021.

(51) Int. Cl.
*H01B 13/012* (2006.01)

(52) U.S. Cl.
CPC . *H01B 13/01245* (2013.01); *H01B 13/01209* (2013.01)

(58) Field of Classification Search
CPC ... F16B 2/22; F16L 3/13; F16L 3/1203; F16L 3/08; F16L 3/10; F16L 3/1025; H01B 13/012; H01B 13/01209
See application file for complete search history.

(56) References Cited

U.S. PATENT DOCUMENTS

| | | | | |
|---|---|---|---|---|
| 4,029,277 A * | 6/1977 | Bulanda | F16G 11/103 | 248/74.1 |
| 4,917,340 A * | 4/1990 | Juemann | F16L 3/13 | 248/74.2 |
| 2002/0000026 A1* | 1/2002 | Noda | F16L 3/1041 | 24/458 |

FOREIGN PATENT DOCUMENTS

DE 3340537 A1 * 5/1985

OTHER PUBLICATIONS

ABB Installation Products, "TC86—Re-Openable Clamp with Steel Spring," (Jul. 6, 2022) https://.tnb.com/sps/fulltilt/index.cgi?co=US &part=TC86.

Panduit, "Quick-Build Harness Board Accessory RER1.25-S6-X," (Jul. 6, 2022) https://.panduit.com/en/products/wire-routing-management-protection/harness-boards-accessories/harness-board-accessories/rer1 25-s6-x.html.

Panduit, "Quick-Build Harness Board Accessory ER1.25-E4-X," (Jul. 6, 2022) https://.panduit.com/en/products/wire-routing-management-protection/harness-boards-accessories/harness-board-accessories/er1_25-e4-x.html.

(Continued)

*Primary Examiner* — Livius R. Cazan
(74) *Attorney, Agent, or Firm* — Kolitch Romano Dascenzo Gates LLP

(57) ABSTRACT

A retaining fixture for attachment to a wire-harness board comprises a base, a first arm, a second arm, a first gripping member, and a second gripping member. The first arm extends from the base. The second arm extends from the base. The first gripping member is coupled to the first arm and comprises a first-gripping-member surface that is convex toward the second arm. The second gripping member is coupled to the second arm and comprises a second-gripping-member surface that is convex toward the first arm. The first (Continued)

gripping member and the second gripping member are resiliently deformable.

20 Claims, 21 Drawing Sheets

(56) References Cited

OTHER PUBLICATIONS

Panduit, "Harness Board Accessories—WEH-E8-C," (Jul. 6, 2022) https://.panduit.com/en/products/wire-routing-management-protection/harness-boards-accessories/harness-board-accessories/weh-e8-c.html.
Panduit, "Quick-Build Harness Board Accessory BR.5-E6-C," (Jul. 6, 2022) https://.panduit.com/en/products/wire-routing-management-protection/harness-boards-accessories/harness-board-accessories/br_5-e6-c.html.
Panduit, "Harness Board Accessories HBN3-T," (Jul. 6, 2022) https://.panduit.com/en/products/wire-routing-management-protection/harness-boards-accessories/harness-board-accessories/hbn3-t.html.
Panduit, "Quick-Build Harness Board Accessories," (Jul. 6, 2022) https://.panduit.com/en/products/wire-routing-management-protection/harness-boards-accessories/harness-board-accessories.html.
Panduit, "Quick-Build Harness Board System," (Jul. 6, 2022) https://.digikey.com/en/product-highlight/p/panduit/quick-build-harness-board-system.

* cited by examiner

RETAINING FIXTURES AND SYSTEMS FOR MAKING WIRE HARNESSES

RELATED APPLICATION

The present application is a non-provisional of and claims priority to U.S. Provisional Patent Application No. 63/212,215, filed on Jun. 18, 2021, entitled "RETAINING FIXTURES AND SYSTEMS FOR MAKING WIRE HARNESSES," the complete disclosure of which is incorporated by reference.

FIELD

Retaining fixtures and systems for making wire harnesses are disclosed herein.

BACKGROUND

A wire harness is an assembly of wires, cables, protective sleeving, connectors, and other components, specifically configured for various applications. For example, wire harnesses are used in vehicles, including land, marine, air, and space vehicles, as well as in other types of machinery. Wire harnesses are generally assembled on a board, to which routing pegs, defining the designated wire paths, are affixed. Each wire or bundle of wires is attached to the routing pegs, e.g., with rubber bands, to hold the wire-harness components in place during assembly, which is a slow process that requires fabricators to couple and decouple the rubber bands to and from the routing pegs as each wire or bundle is added. The assembly process also requires fabricators to hold wires with one hand while the rubber bands are coupled to or decoupled from the routing pegs with the other hand.

SUMMARY

Accordingly, apparatuses and methods, intended to address at least the above-identified concerns, would find utility.

The following is a non-exhaustive list of examples of the subject matter, disclosed herein.

Disclosed herein is a retaining fixture for attachment to a wire-harness board. The retaining fixture comprises a base, a first arm, a second arm, a first gripping member, and a second gripping member. The first arm extends from the base. The second arm extends from the base. The first gripping member is coupled to the first arm and comprises a first-gripping-member surface that is convex toward the second arm. The second gripping member is coupled to the second arm and comprises a second-gripping-member surface that is convex toward the first arm. The first gripping member and the second gripping member are resiliently deformable.

The base provides structure for attaching the retaining fixture to a wire-harness board. Accordingly, a plurality of retaining fixtures may be selectively attached and positioned appropriately on the wire-harness board for assembly of a wire harness. The base also supports the first arm and the second arm, which respectively support the first gripping member and the second gripping member. Because the first and second gripping members are resilient, and because the first-gripping-member surface and the second-gripping member surface respectively are convex toward the second arm and the first arm, a wire or a wire bundle is easily engaged with the first-gripping-member surface and the second-gripping-member surface and translated toward the base to be captured and retained by the retaining fixture. In one or more examples, the wire or the wire bundle is retained directly between the first-gripping-member surface and the second-gripping-member surface. In one or more examples, the wire or the wire bundle is retained between the first-gripping-member surface, the second-gripping-member surface, and the base. Because the first and second gripping members are resilient, they automatically urge the first-gripping-member surface and the second-gripping-member surface respectively toward the second arm and the first arm to provide a friction engagement with a wire or a wire bundle that is positioned between the first and second gripping members.

Also disclosed herein is a system for making a wire harness. The system comprises a wire-harness board and a retaining fixture that is coupled to the wire-harness board. The retaining fixture comprises a base, a first arm, a second arm, a first gripping member, and a second gripping member. The base is attached to the wire-harness board. The first arm extends from the base. The second arm extends from the base. The first gripping member is coupled to the first arm and comprises a first-gripping-member surface that is convex toward the second arm. The second gripping member is coupled to the second arm and comprises a second-gripping-member surface that is convex toward the first arm. The first gripping member and the second gripping member are resiliently deformable.

The base provides structure for attaching the retaining fixture to a wire-harness board. Accordingly, a plurality of retaining fixtures can be selectively attached and positioned appropriately on the wire-harness board for assembly of a wire harness. The base also supports the first arm and the second arm, which respectively support the first gripping member and the second gripping member. Because the first and second gripping members are resilient, and because the first-gripping-member surface and the second-gripping member surface respectively are convex toward the second arm and the first arm, a wire or a wire bundle is easily engaged with the first-gripping-member surface and the second-gripping-member surface and translated toward the base to be captured and retained by the retaining fixture. In one or more examples, the wire or the wire bundle is retained directly between the first-gripping-member surface and the second-gripping-member surface. In one or more examples, the wire or the wire bundle is retained between the first-gripping-member surface, the second-gripping-member surface, and the base. Because the first and second gripping members are resilient, they automatically urge the first-gripping-member surface and the second-gripping-member surface respectively toward the second arm and the first arm to provide a friction engagement with a wire or a wire bundle that is positioned between the first and second gripping members.

BRIEF DESCRIPTION OF THE DRAWINGS

Reference will now be made to the accompanying drawings, which are not necessarily drawn to scale, and where like reference characters designate the same or similar parts throughout the several views. In the drawings.

DESCRIPTION

Figure 1:
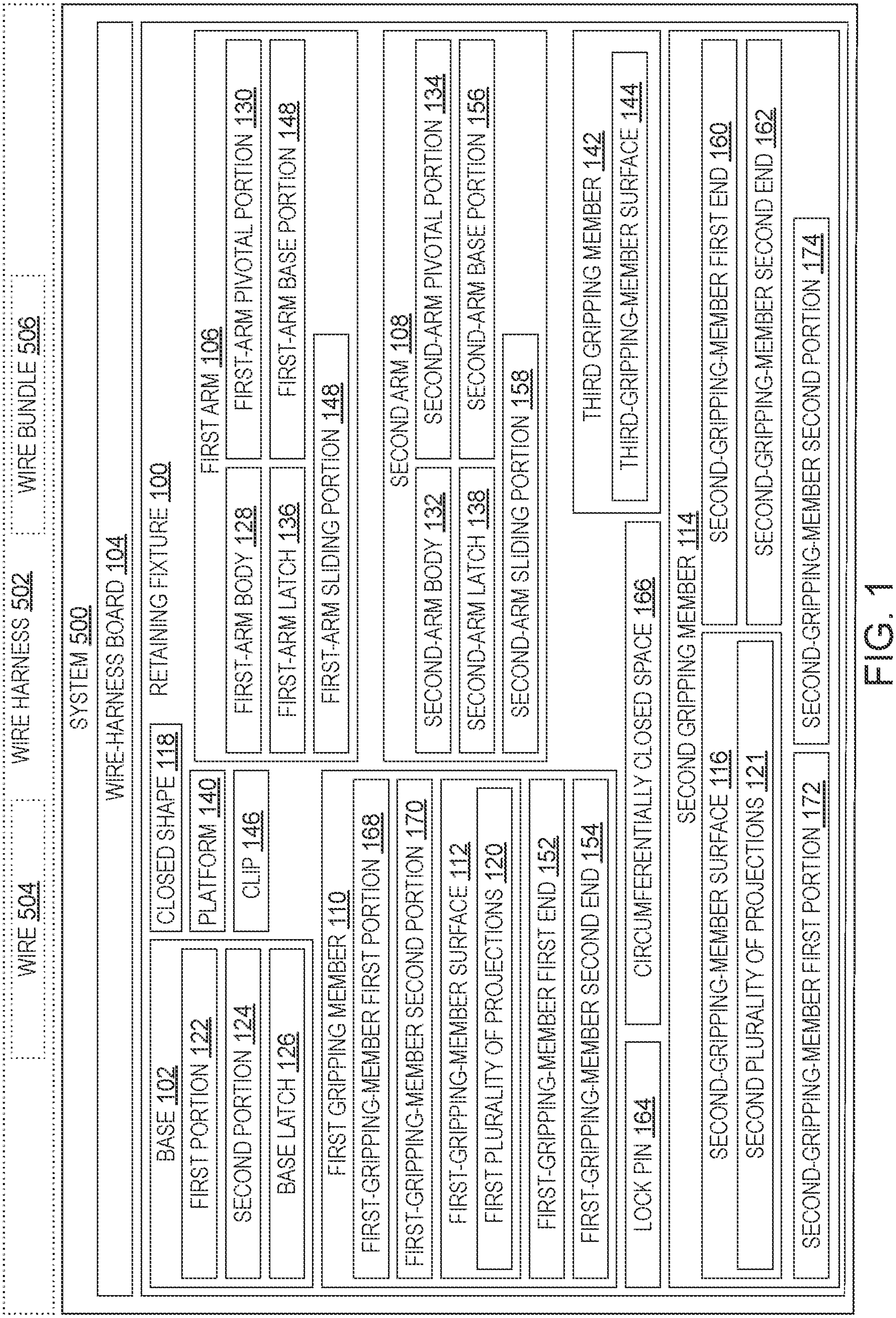
FIG. 1 is a block diagram of a system for making a wire harness and a retaining fixture for attachment to a wire-harness board, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Figure 3:
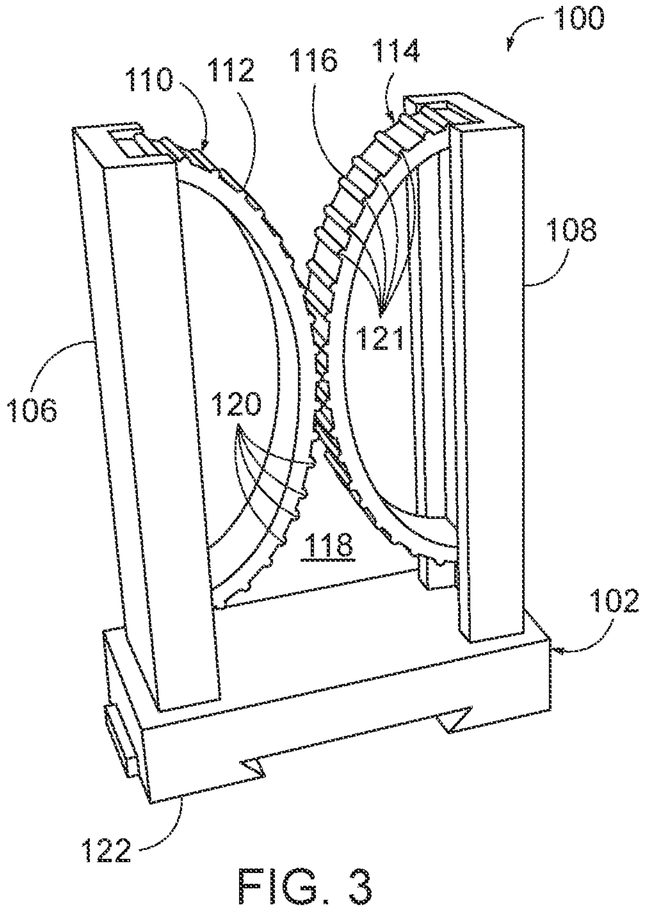
FIG. 3 is a schematic, perspective view of the retaining fixture of FIG. 1, according to one or more examples of the subject matter, disclosed herein.
Figure 4:
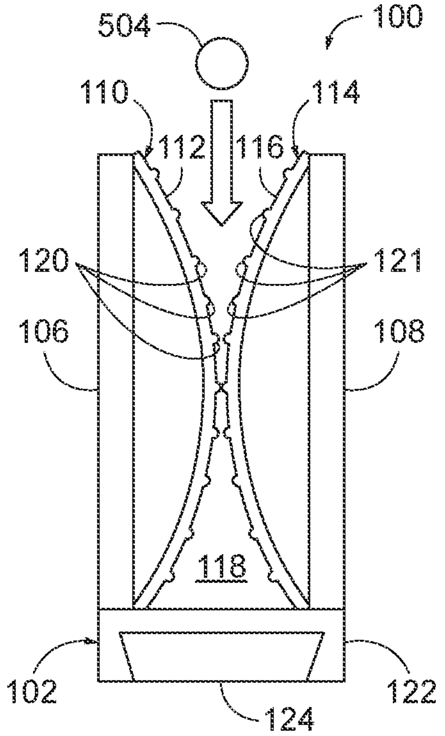
FIG. 4 is a schematic, front view of the retaining fixture of FIG. 1, showing insertion of a wire, according to one or more examples of the subject matter, disclosed herein.
Figure 5:
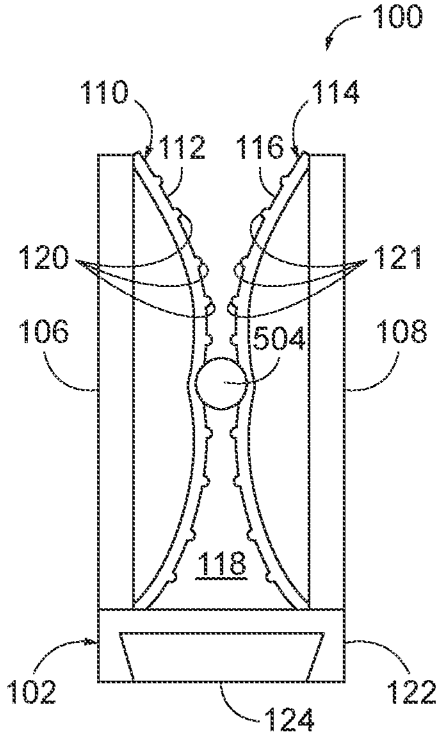
FIG. 5 is a schematic, front view of the retaining fixture of FIG. 4, showing retention of a wire between the first and second gripping members, according to one or more examples of the subject matter, disclosed herein.
Figure 6:
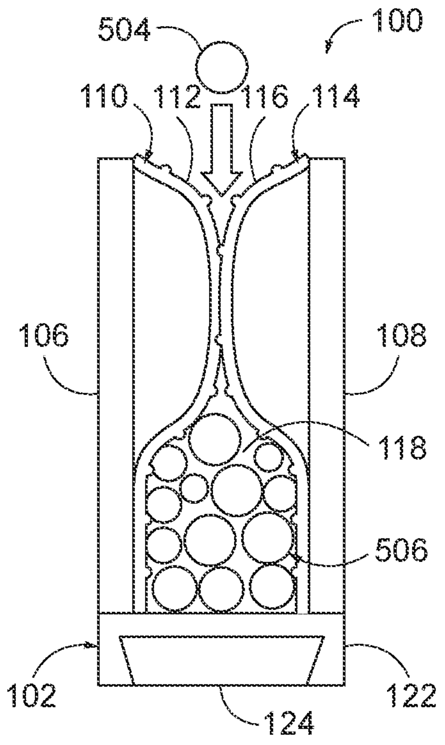
FIG. 6 is a schematic, front view of the retaining fixture of FIG. 4, showing insertion of a wire into and retention of a wire bundle by the retaining fixture, according to one or more examples of the subject matter, disclosed herein.
Figure 69:
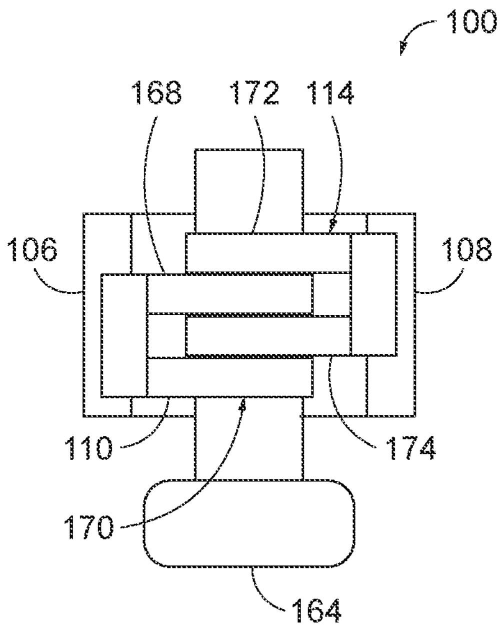
FIG. 69 is a schematic, top view of the retaining fixture of FIG. 68, according to one or more examples of the subject matter, disclosed herein.
Figure 70:
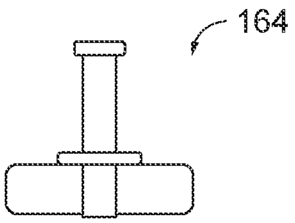
FIG. 70 is a schematic, top view of the lock pin of the retaining fixture of FIG. 1, according to one or more examples of the subject matter, disclosed herein.
Figure 71:
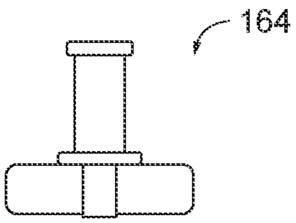
FIG. 71 is a schematic, top view of the lock pin of the retaining fixture of FIG. 1, according to one or more examples of the subject matter, disclosed herein.
Figure 72:
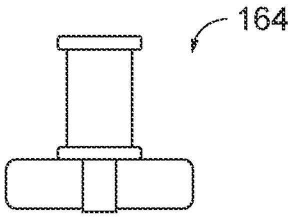
FIG. 72 is a schematic, top view of the lock pin of the retaining fixture of FIG. 1, according to one or more examples of the subject matter, disclosed herein.
Figure 73:
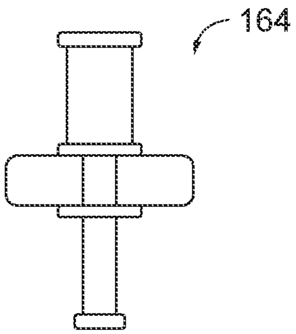
FIG. 73 is a schematic, top view of the lock pin of the retaining fixture of FIG. 1, according to one or more examples of the subject matter, disclosed herein.
Figure 74:
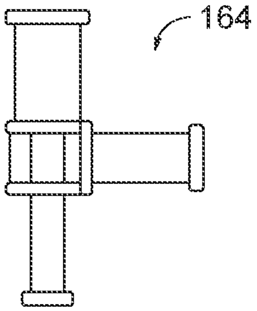
FIG. 74 is a schematic, top view of the lock pin of the retaining fixture of FIG. 1, according to one or more examples of the subject matter, disclosed herein.
Figure 75:
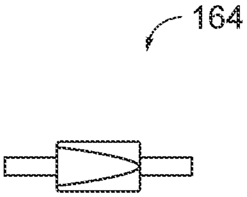
FIG. 75 is a schematic, rear view of the lock pin of the retaining fixture of FIG. 1, according to one or more examples of the subject matter, disclosed herein.
Figure 76:
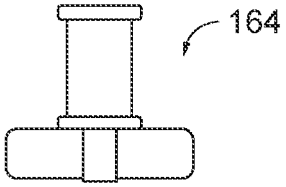
FIG. 76 is a schematic, top view of the lock pin of FIG. 75, according to one or more examples of the subject matter, disclosed herein.
Figure 77:
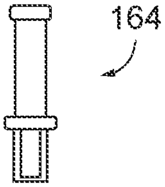
FIG. 77 is a schematic, side view of the lock pin of FIG. 75, according to one or more examples of the subject matter, disclosed herein.
Figure 78:
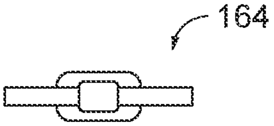
FIG. 78 is a schematic, front view of the lock pin of FIG. 75, according to one or more examples of the subject matter, disclosed herein.
Figure 79:
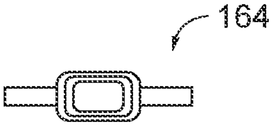
FIG. 79 is a schematic, rear view of the lock pin of the retaining fixture of FIG. 1, according to one or more examples of the subject matter, disclosed herein.
Figure 80:
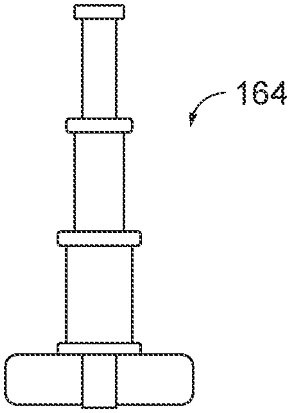
FIG. 80 is a schematic, top view of the lock pin of FIG. 79, according to one or more examples of the subject matter, disclosed herein.
Figure 81:
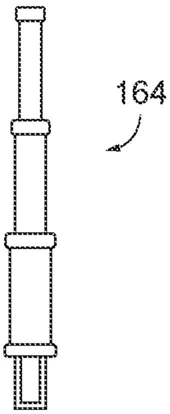
FIG. 81 is a schematic, side view of the lock pin of FIG. 79, according to one or more examples of the subject matter, disclosed herein.
Figure 82:
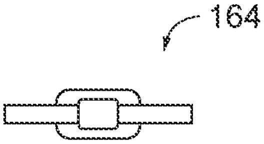
FIG. 82 is a schematic, front view of the lock pin of FIG. 79, according to one or more examples of the subject matter, disclosed herein.

Referring generally to FIG. 1 and particularly to, e.g., FIGS. 3-69 for illustrative purposes only and not by way of limitation, the following portion of this paragraph delineates example 1 of the subject matter, disclosed herein. According to example 1, retaining fixture 100 for attachment to wire-harness board 104 comprises base 102, first arm 106, second arm 108, first gripping member 110, and second gripping member 114. First arm extends from base 102, second arm 108 extends from base 102, and first gripping member 110 is coupled to first arm 106 and comprises first-gripping-member surface 112 that is convex toward second arm 108. Second gripping member 114 is coupled to second arm 108 and comprises second-gripping-member surface 116 that is convex toward first arm 106. First gripping member 110 and second gripping member 114 are resiliently deformable.

Base 102 provides structure for attaching retaining fixture 100 to wire-harness board 104. Accordingly, a plurality of retaining fixtures can be selectively attached and positioned appropriately on wire-harness board 104 for assembly of wire harness 502, as illustrated, e.g., in FIG. 2. Base 102 also supports first arm 106 and second arm 108, which respectively support first gripping member 110 and second gripping member 114. Because the first and second gripping members are resilient, and because first-gripping-member surface 112 and second-gripping-member surface 116 respectively are convex toward second arm 108 and first arm 106, wire 504 or wire bundle 506 is easily engaged with first-gripping-member surface 112 and second-gripping-member surface 116 and translated toward base 102 to be captured and retained by retaining fixture 100. In one or more examples, wire 504 or wire bundle 506 is retained directly between first-gripping-member surface 112 and second-gripping-member surface 116. In one or more examples, wire 504 or wire bundle 506 is retained between first-gripping-member surface 112, second-gripping-member surface 116, and base 102. Because the first and second gripping members are resilient, they automatically urge first-gripping-member surface 112 and second-gripping-member surface 116 respectively toward second arm 108 and first arm 106 to provide a friction engagement with wire 504 or wire bundle 506 that is positioned between the first and second gripping members.

In one or more examples, base 102 is configured to be attached to wire-harness board 104 via any suitable mechanism, such as, but not limited to, screws, bolts, or other fasteners, adhesive, clips, etc.

In one or more examples, the griping members are constructed from any suitable resilient material, such as natural rubber, various synthetic rubbers, silicone, etc.

Figure 8:
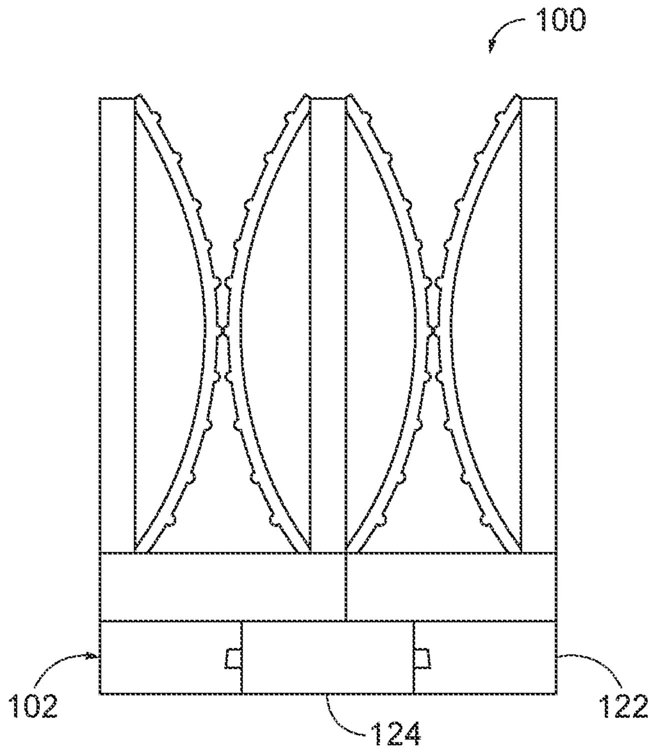
FIG. 8 is a schematic, front view of the retaining fixture of FIG. 1, according to one or more examples of the subject matter, disclosed herein.
Figure 9:
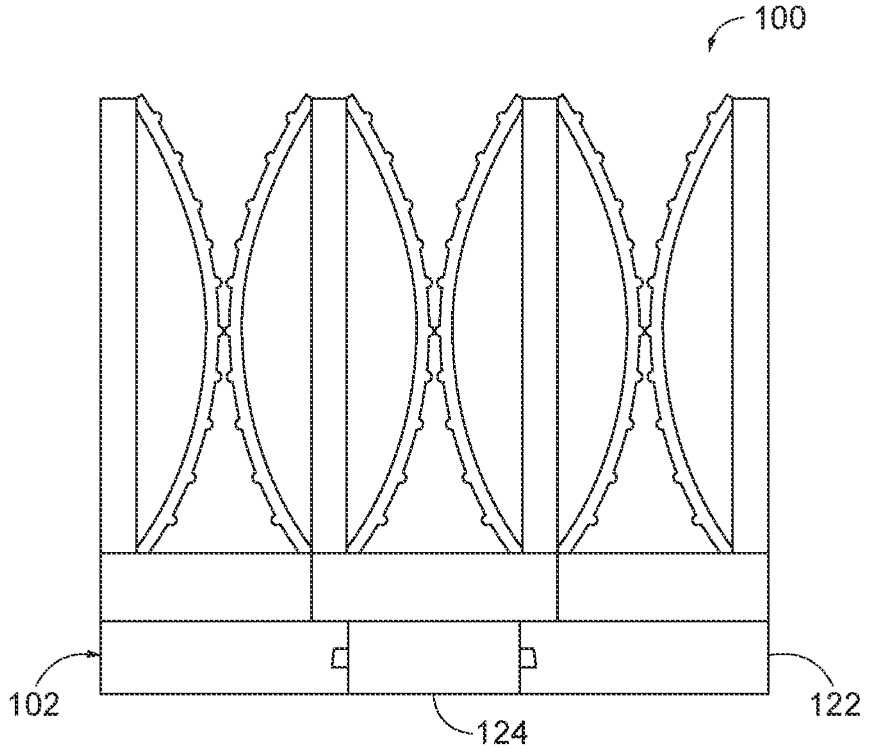
FIG. 9 is a schematic, front view of the retaining fixture of FIG. 1, according to one or more examples of the subject matter, disclosed herein.
Figure 10:
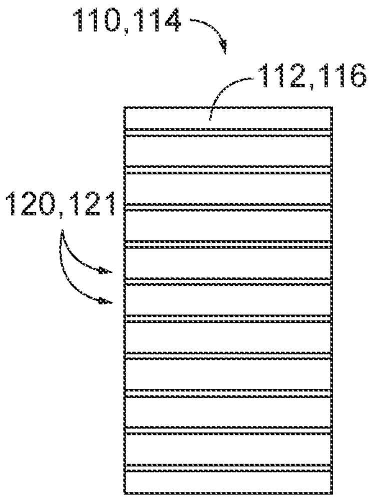
FIG. 10 is a schematic, plan view of a gripping member of the retaining fixture of FIG. 1, according to one or more examples of the subject matter, disclosed herein.
Figure 11:
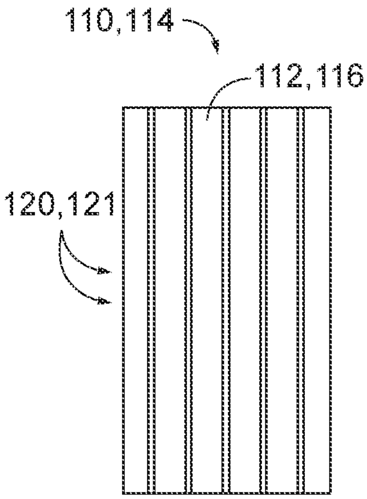
FIG. 11 is a schematic, plan view of a gripping member of the retaining fixture of FIG. 1, according to one or more examples of the subject matter, disclosed herein.
Figure 12:
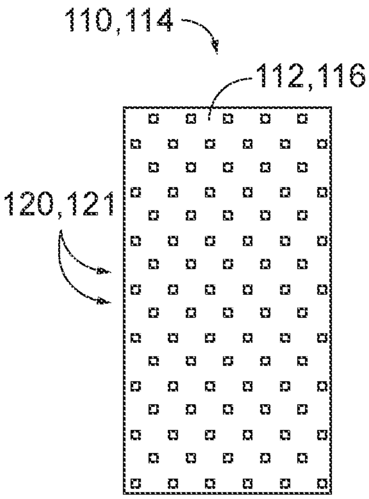
FIG. 12 is a schematic, plan view of a gripping member of the retaining fixture of FIG. 1, according to one or more examples of the subject matter, disclosed herein.
Figure 13:
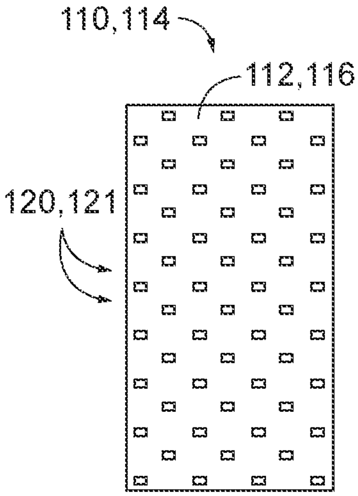
FIG. 13 is a schematic, plan view of a gripping member of the retaining fixture of FIG. 1, according to one or more examples of the subject matter, disclosed herein.
Figure 14:
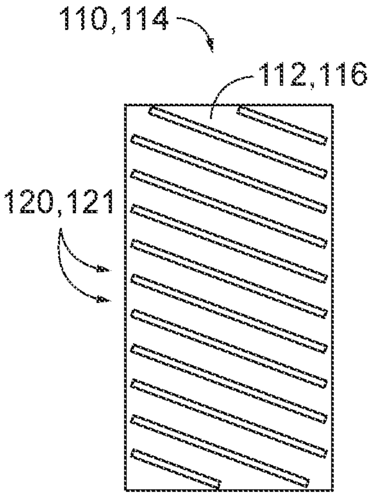
FIG. 14 is a schematic, plan view of a gripping member of the retaining fixture of FIG. 1, according to one or more examples of the subject matter, disclosed herein.
Figure 15:
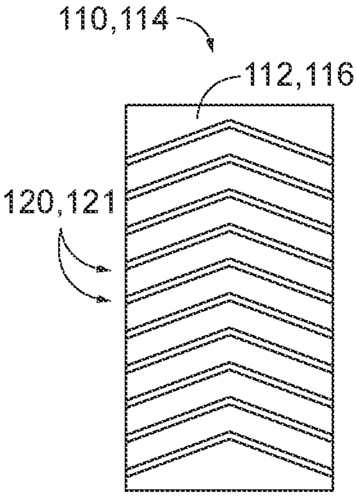
FIG. 15 is a schematic, plan view of a gripping member of the retaining fixture of FIG. 1, according to one or more examples of the subject matter, disclosed herein.
Figure 16:
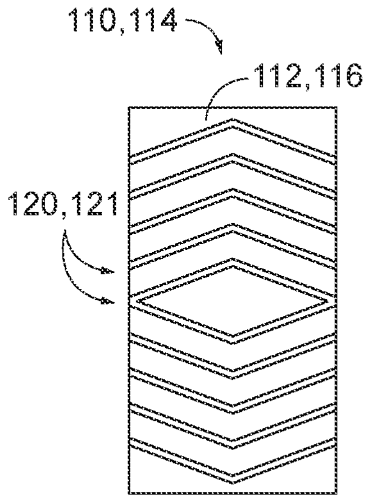
FIG. 16 is a schematic, plan view of a gripping member of the retaining fixture of FIG. 1, according to one or more examples of the subject matter, disclosed herein.
Figure 17:
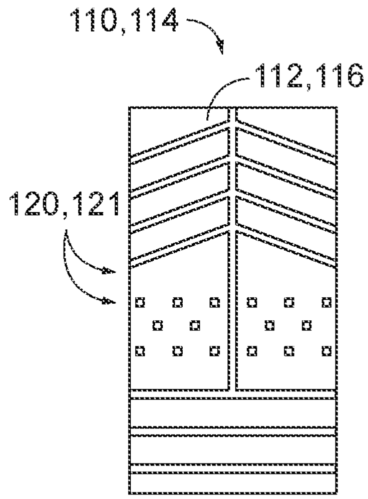
FIG. 17 is a schematic, plan view of a gripping member of the retaining fixture of FIG. 1, according to one or more examples of the subject matter, disclosed herein.
Figure 18:
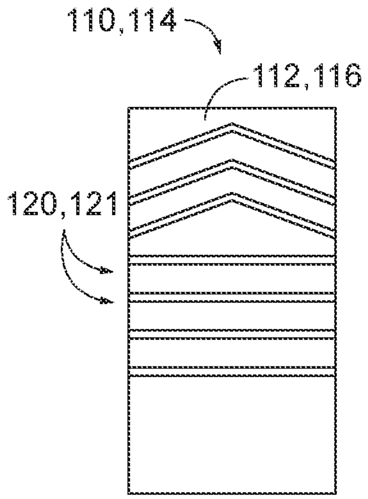
FIG. 18 is a schematic, plan view of a gripping member of the retaining fixture of FIG. 1, according to one or more examples of the subject matter, disclosed herein.
Figure 19:
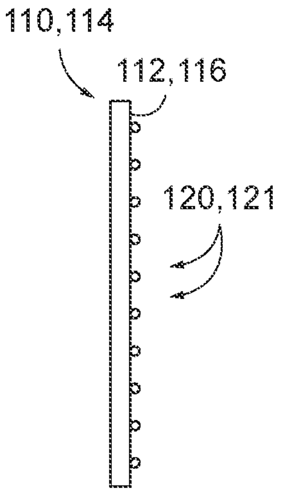
FIG. 19 is a schematic, side view of a gripping member of the retaining fixture of FIG. 1, according to one or more examples of the subject matter, disclosed herein.
Figure 20:
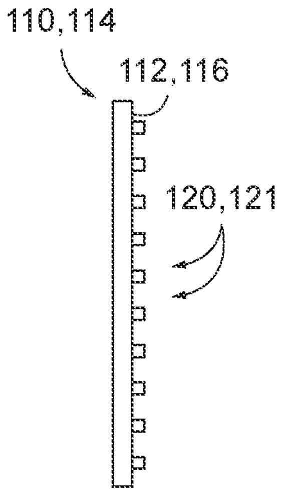
FIG. 20 is a schematic, side view of a gripping member of the retaining fixture of FIG. 1, according to one or more examples of the subject matter, disclosed herein.
Figure 21:
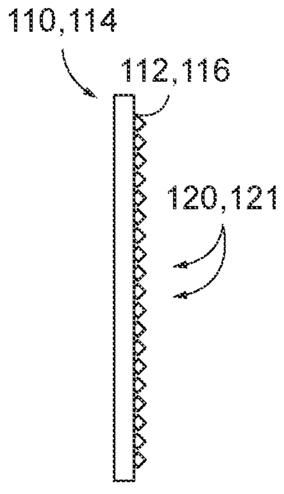
FIG. 21 is a schematic, side view of a gripping member of the retaining fixture of FIG. 1, according to one or more examples of the subject matter, disclosed herein.

As illustrated in FIGS. 8 and 9, in one or more examples, retaining fixture 100 includes more than two arms and more than two gripping members, such as to be configured to retain two, three, or more than three wires or wire bundles adjacent to each other.

Referring generally to FIG. 1 and particularly to, e.g., FIGS. 3-9, 23, 27, 28, 34, 38, 39, 42, 43, 50, 51, 55, 59, 65, 66, and 68 for illustrative purposes only and not by way of limitation, the following portion of this paragraph delineates example 2 of the subject matter, disclosed herein. According to example 2, which encompasses example 1, above, base 102, first-gripping-member surface 112, and second-gripping-member surface 116 collectively define at least a portion of closed shape 118.

Closed shape 118 provides a volume, within which wire 504 or wire bundle 506 is retained. Wire 504 or wire bundle 506, whose cross-sectional area or shape is smaller than the cross-sectional area or shape of closed shape 118, will be fully retained within closed shape 118. However, because the first and second gripping members are resilient, wire 504 or wire bundle 506, whose cross-sectional area or shape is larger than the cross-sectional area or shape of closed shape 118, will extend beyond closed shape 118 directly between first-gripping-member surface 112 and second gripping member 114, with the first and second gripping members effectively and frictionally gripping wire 504 or wire bundle 506 and retaining it at least partially within closed shape 118.

Figure 65:
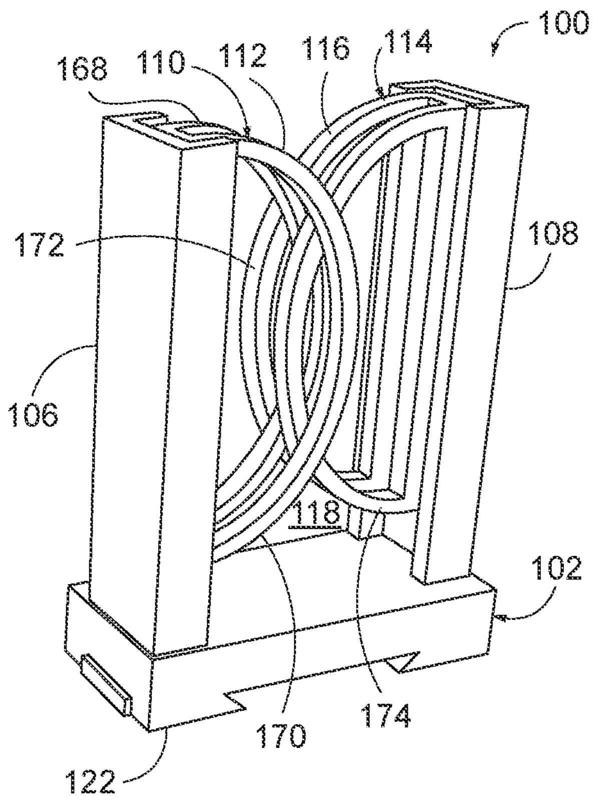
FIG. 65 is a schematic, perspective view of the retaining fixture of FIG. 1, according to one or more examples of the subject matter, disclosed herein.
Figure 66:
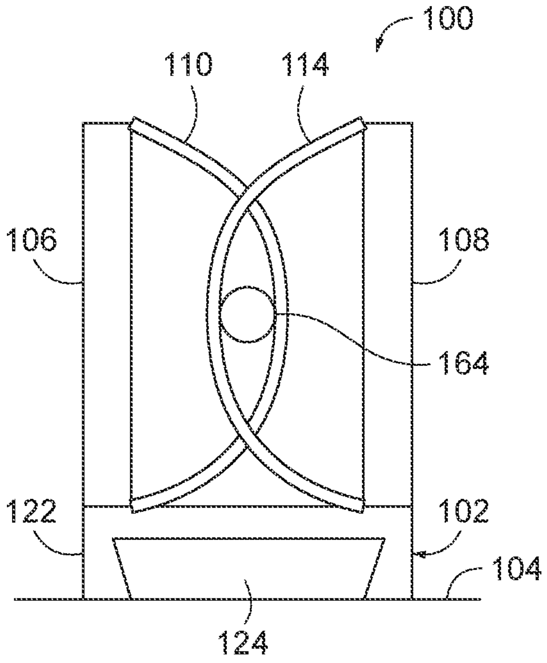
FIG. 66 is a schematic, front view of the retaining fixture of FIG. 1, comprising a lock pin, according to one or more examples of the subject matter, disclosed herein.
Figure 67:
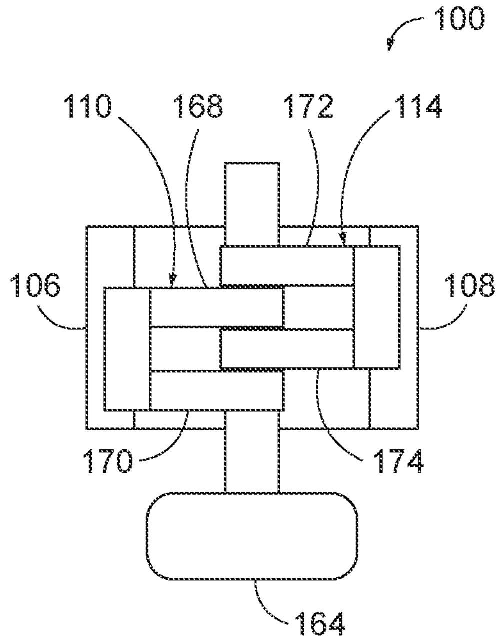
FIG. 67 is a schematic, top view of the retaining fixture of FIG. 66, according to one or more examples of the subject matter, disclosed herein.
Figure 68:
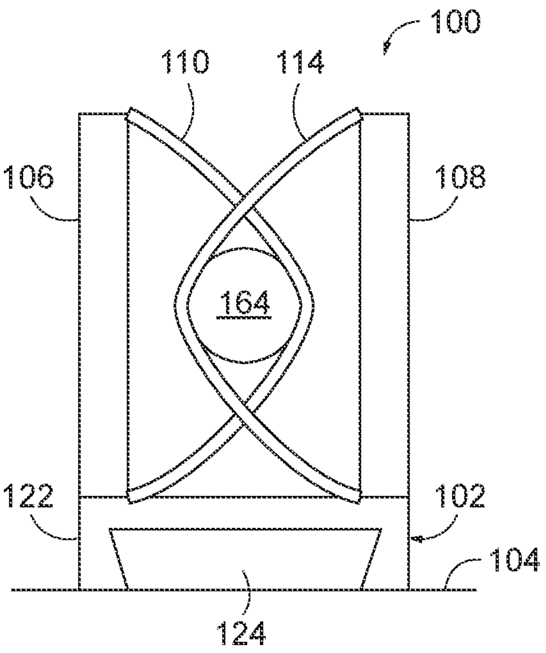
FIG. 68 is a schematic, front view of the retaining fixture of FIG. 1, comprising a lock pin, according to one or more examples of the subject matter, disclosed herein.

Referring generally to FIG. 1 and particularly to, e.g., FIGS. 3 and 65 for illustrative purposes only and not by way of limitation, the following portion of this paragraph delineates example 3 of the subject matter, disclosed herein. According to example 3, which encompasses example 2, above, closed shape 118 is further defined by first arm 106 and second arm 108.

By partially defining closed shape 118 with the first and second arms, closed shape 118 provides a larger cross-sectional area for receipt of wire 504 or wire bundle 506.

Referring generally to FIG. 1 and particularly to, e.g., FIGS. 3-9, 23, 27, 28, 34, 35, 38-40, 42-44, 50, 51, 54, 55, 58-60, 64, and 65-69 for illustrative purposes only and not by way of limitation, the following portion of this paragraph delineates example 4 of the subject matter, disclosed herein. According to example 4, which encompasses any one of examples 1 to 3, above, first arm 106 and second arm 108 are parallel to each other.

By having first arm 106 and second arm 108 parallel to each other, the overall volume and geometry of retaining fixture 100 is optimized without a detrimental effect to the functionality of the receipt and dispensing of wire 504 or wire bundle 506 to and from retaining fixture 100. Referring generally to FIG. 1 and particularly to, e.g., FIGS. 3-22, 23, 27, 28, 34, 35, 38, 39, 42-44, 50, 51, 55, 56, 58, 59, 60, and 64 for illustrative purposes only and not by way of limitation, the following portion of this paragraph delineates example 5 of the subject matter, disclosed herein. According to example 5, which encompasses any one of examples 1 to 4, above, first-gripping-member surface 112 comprises first plurality of projections 120, and second-gripping-member surface 116 comprises second plurality of projections 121.

The projections provide increased frictional engagement with wire 504 or wire bundle 506 positioned between the first and second gripping members.

Figure 22:
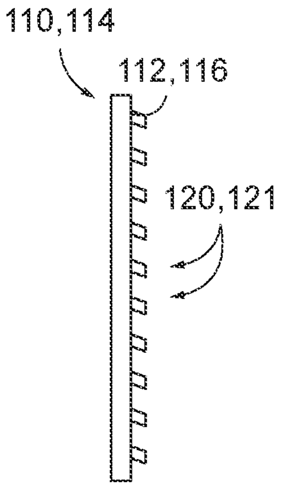
FIG. 22 is a schematic, side view of a gripping member of the retaining fixture of FIG. 1, according to one or more examples of the subject matter, disclosed herein.

Referring generally to FIG. 1 and particularly to, e.g., FIG. 22 for illustrative purposes only and not by way of limitation, the following portion of this paragraph delineates example 6 of the subject matter, disclosed herein. According to example 6, which encompasses example 5, above, at least one of first plurality of projections 120 is angled toward base 102, and at least one of second plurality of projections 121 is angled toward base 102.

By being angled toward base 102, the projections facilitate ease of translation of wire 504 or wire bundle 506 past the projections and further facilitate retention of wire 504 or wire bundle 506 within retaining fixture 100.

Figure 7:
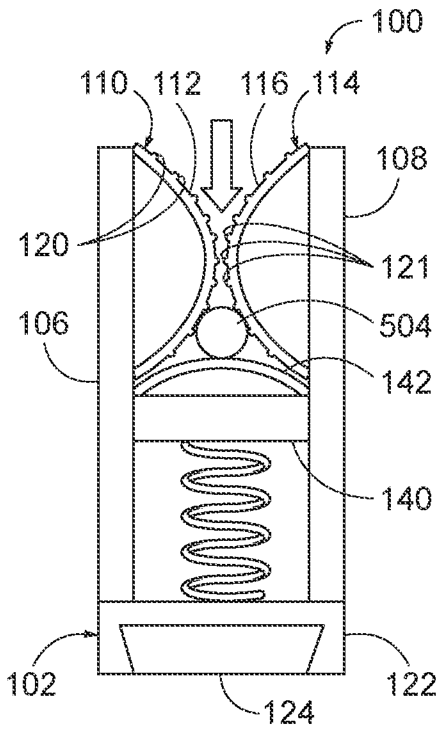
FIG. 7 is a schematic, front view of the retaining fixture of FIG. 1, according to one or more examples of the subject matter, disclosed herein.

Referring generally to FIG. 1 and particularly to, e.g., FIG. 7 for illustrative purposes only and not by way of limitation, the following portion of this paragraph delineates example 7 of the subject matter, disclosed herein. According to example 7, which encompasses any one of examples 1 to 6, above, retaining fixture 100 further comprises platform 140, extending between first arm 106 and second arm 108. Platform 140 is biased away from base 102.

By being spring-biased away from base 102, platform 140 automatically urges wire 504 or wire bundle 506 into frictional engagement with first gripping member 110 and second gripping member 114 to thereby restrict movement of wire 504 or wire bundle 506 relative to retaining fixture 100. In one or more examples, platform 140 is biased away from base by a spring.

Referring generally to FIG. 1 and particularly to, e.g., FIG. 7 for illustrative purposes only and not by way of limitation, the following portion of this paragraph delineates example 8 of the subject matter, disclosed herein. According to example 8, which encompasses example 7, above, retaining fixture 100 further comprises third gripping member 142, coupled to platform 140. Third gripping member 142 comprises third-gripping-member surface 144 that is convex away from base 102. Third gripping member 142 is resiliently deformable.

Because third gripping member 142 is resilient, together with platform 140, it automatically urges wire 504 or wire bundle 506 into frictional engagement with first gripping member 110 and second gripping member 114 to thereby restrict movement of wire 504 or wire bundle 506 relative to retaining fixture 100.

Referring generally to FIG. 1, the following portion of this paragraph delineates example 9 of the subject matter, disclosed herein. According to example 9, which encompasses any one of examples 1 to 6, above, retaining fixture 100 further comprises third gripping member 142, coupled to base 102. Third gripping member 142 comprises third-gripping-member surface 144 that is convex away from base 102. Third gripping member 142 is resiliently deformable.

Because third gripping member 142 is resilient, it automatically urges wire 504 or wire bundle 506 into frictional engagement with first gripping member 110 and second gripping member 114 to thereby restrict movement of wire 504 or wire bundle 506 relative to retaining fixture 100.

Referring generally to FIG. 1 and particularly to, e.g., FIGS. 3-9, 23-32, 34, 35, 38, 39, 41-44, 50-52, 54-61, and 64-68 for illustrative purposes only and not by way of limitation, the following portion of this paragraph delineates example 10 of the subject matter, disclosed herein. According to example 10, which encompasses any one of examples 1 to 9, above, base 102 comprises first portion 122 and second portion 124. First portion 122 is coupled to first arm 106 and second arm 108. Second portion 124 is releasably coupled to first portion 122.

Because second portion 124 of base 102 is releasably coupled to first portion 122 of base 102, second portion 124 is able to be selectively coupled to wire-harness board 104 with the remainder of retaining fixture 100 able to be selectively coupled to and decoupled from second portion 124. Accordingly, during assembly of wire harness 502, a plurality of second portions is coupled to wire-harness board 104 in appropriate positions, and a selection of first portions of retaining fixtures are subsequently coupled to the second portions. Moreover, during assembly of wiring harness 502, one retaining fixture is able to be swapped out with another retaining fixture, such as to accommodate a larger wire bundle, without removal of one second portion and replacement with another second portion. In addition, installation of second portions onto wire-harness board 104 is easier than installation of complete retaining fixtures.

In one or more examples, second portion 124 is configured to be attached to wire-harness board 104 via any suitable mechanism, such as, but not limited to, screws, bolts, or other fasteners, adhesive, clips, etc.

Referring generally to FIG. 1 and particularly to, e.g., FIGS. 4-9, 26-35, 38, 39, 41-44, 50-52, 54-61, and 64-69 for illustrative purposes only and not by way of limitation, the following portion of this paragraph delineates example 11 of the subject matter, disclosed herein. According to example 11, which encompasses example 10, above, first portion 122 of base 102 and second portion 124 of base 102 are translatable, but not rotatable, relative to each other.

By being translatable relative to each other, a secure connection with maximum attainable contact area between first portion 122 and second portion 124 results.

Figure 23:
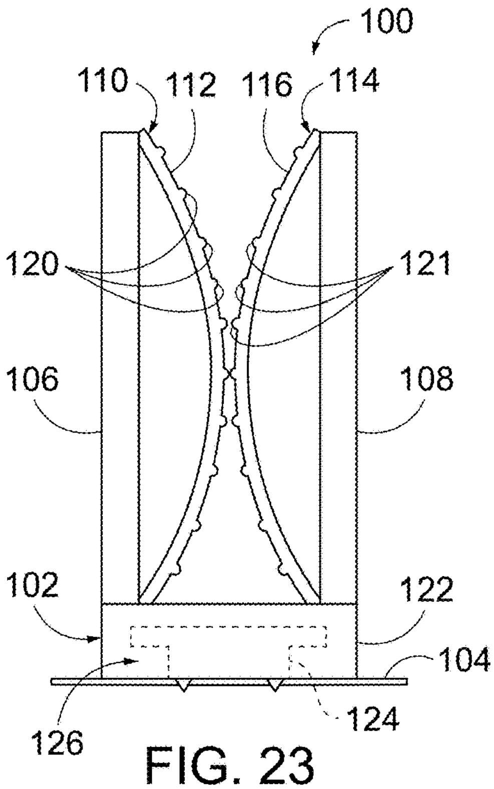
FIG. 23 is a schematic, front view of the retaining fixture of FIG. 1, according to one or more examples of the subject matter, disclosed herein.
Figure 24:
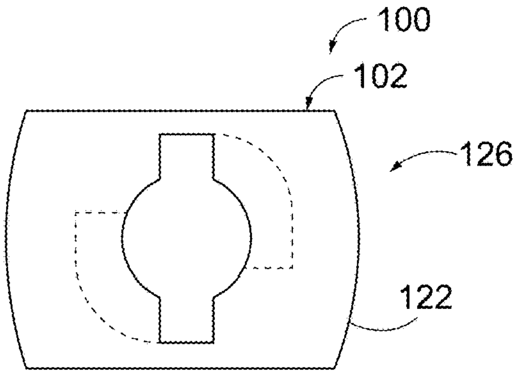
FIG. 24 is a schematic, bottom view of the base of the retaining fixture of FIG. 23, according to one or more examples of the subject matter, disclosed herein.
Figure 25:
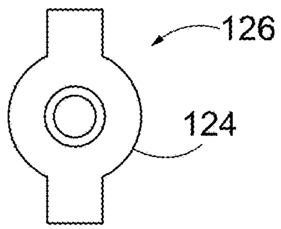
FIG. 25 is a schematic, top view of the second portion of the retaining fixture of FIG. 23, according to one or more examples of the subject matter, disclosed herein.
Figure 26:
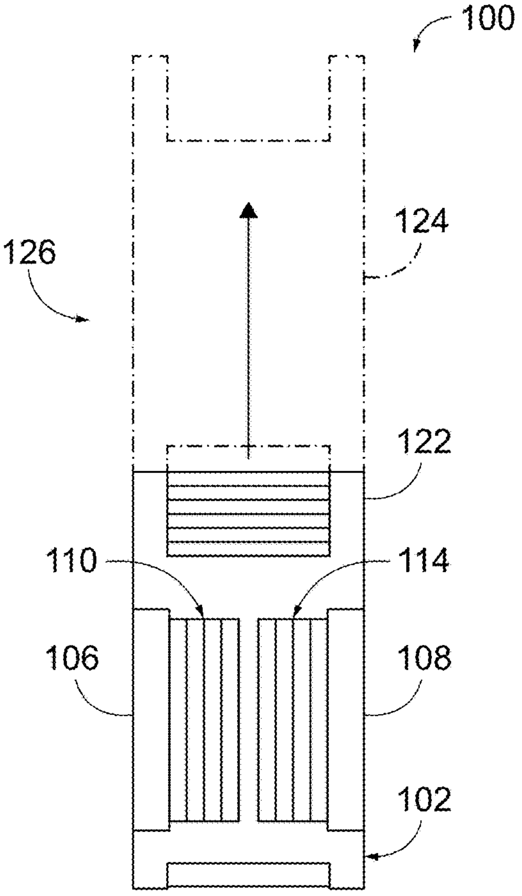
FIG. 26 is a schematic, top view of the retaining fixture of FIG. 1, according to one or more examples of the subject matter, disclosed herein.
Figure 27:
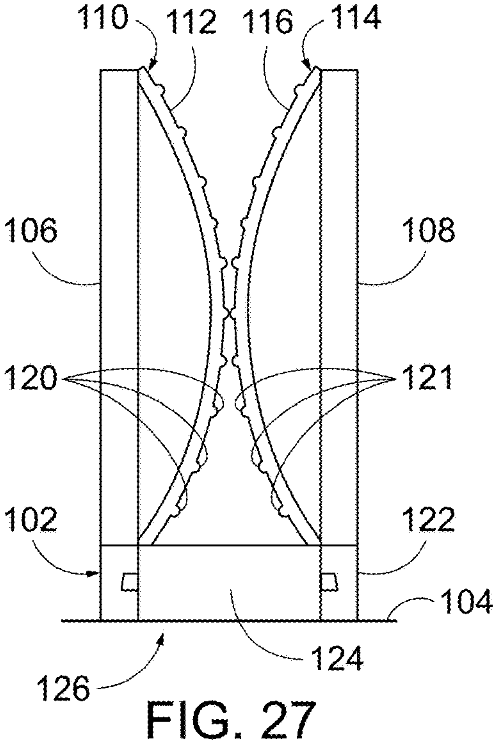
FIG. 27 is a schematic, front view of the retaining fixture of FIG. 26, according to one or more examples of the subject matter, disclosed herein.
Figure 28:
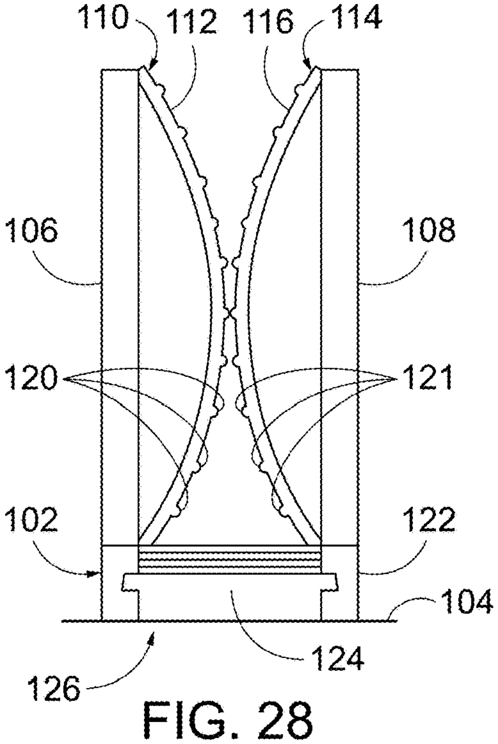
FIG. 28 is a schematic, rear view of the retaining fixture of FIG. 26, according to one or more examples of the subject matter, disclosed herein.
Figure 29:
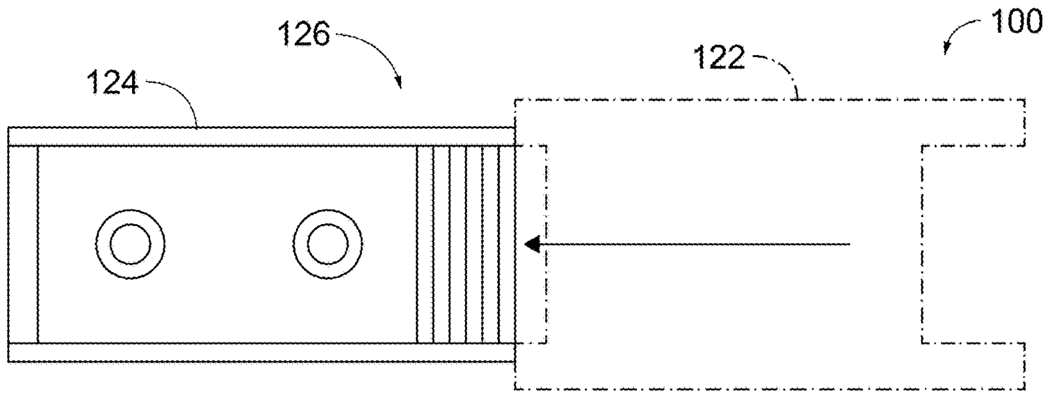
FIG. 29 is a schematic, top view of the retaining fixture of FIG. 26, showing the first portion of the base being attached to the second portion of the base, according to one or more examples of the subject matter, disclosed herein.
Figure 30:
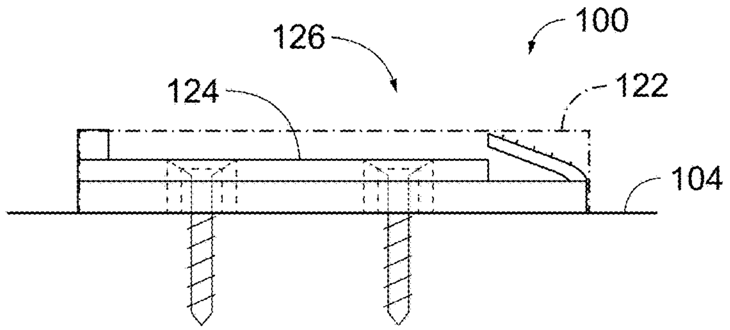
FIG. 30 is a schematic, side view of the second portion of the base of the retaining fixture of FIG. 26, according to one or more examples of the subject matter, disclosed herein.
Figure 31:
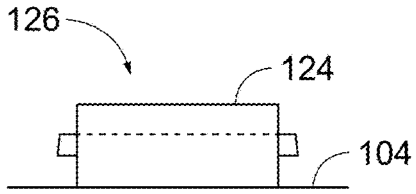
FIG. 31 is a schematic, front view of the second portion of the base of the retaining fixture of FIG. 26, according to one or more examples of the subject matter, disclosed herein.
Figure 32:
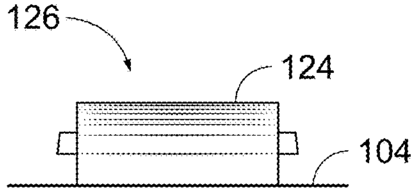
FIG. 32 is a schematic, rear view of the second portion of the base of the retaining fixture of FIG. 26, according to one or more examples of the subject matter, disclosed herein.

Referring generally to FIG. 1 and particularly to, e.g., FIGS. 23-25 for illustrative purposes only and not by way of limitation, the following portion of this paragraph delineates example 12 of the subject matter, disclosed herein. According to example 12, which encompasses example 10, above, first portion 122 of base 102 and second portion 124 of base 102 are rotatable, but not translatable, relative to each other.

By being rotatably attached to second portion 124, the remainder of retaining fixture 100 is easily coupled to and decoupled from second portion 124 in tight spaces, such as when an adjacent fixture or a portion of wire harness 502 is present.

In the illustrated examples of FIGS. 23-25, first portion 122 of base 102 defines a pocket, within which second portion 124 is received. However, in one or more examples, second portion 124 of base 102 defines a pocket, within which first portion 122 is received. In this latter option, in one or more examples, second portion 124 can be embedded within wire-harness board 104 to create a low-profile wire-harness board, which is easier to store.

Referring generally to FIG. 1 and particularly to, e.g., FIGS. 23-35, 44, 54, 58, and 64 for illustrative purposes only and not by way of limitation, the following portion of this paragraph delineates example 13 of the subject matter, disclosed herein. According to example 13, which encompasses any one of examples 10 to 12, above, base 102 further comprises base latch 126, configured to secure first portion 122 of base 102 to second portion 124 of base 102.

Inclusion of base latch 126 ensures that first portion 122 and the remainder of retaining fixture 100 will not inadvertently detach from second portion 124.

Figure 33:
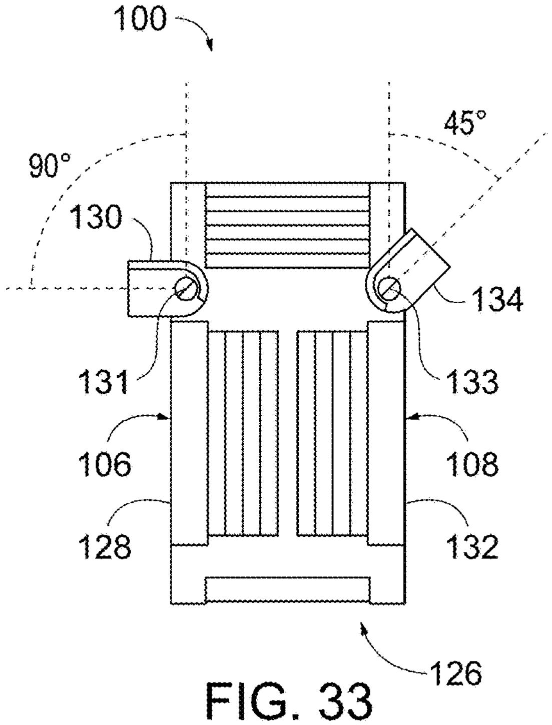
FIG. 33 is a schematic, top view of the retaining fixture of FIG. 1, according to one or more examples of the subject matter, disclosed herein.
Figure 34:
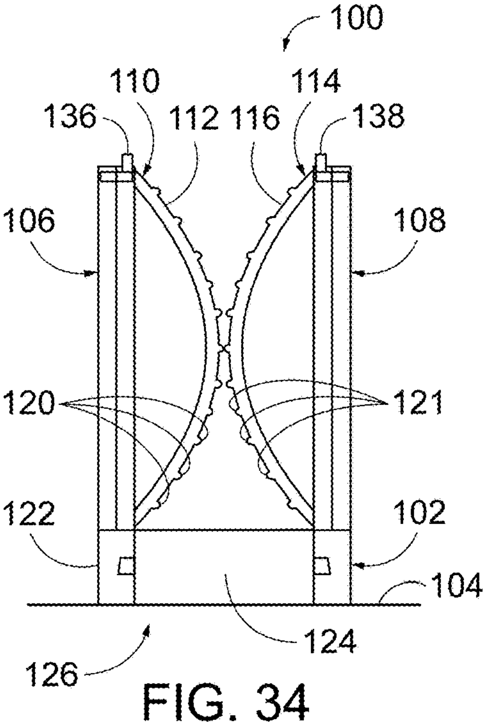
FIG. 34 is a schematic, front view of the retaining fixture of FIG. 33, according to one or more examples of the subject matter, disclosed herein.
Figure 35:
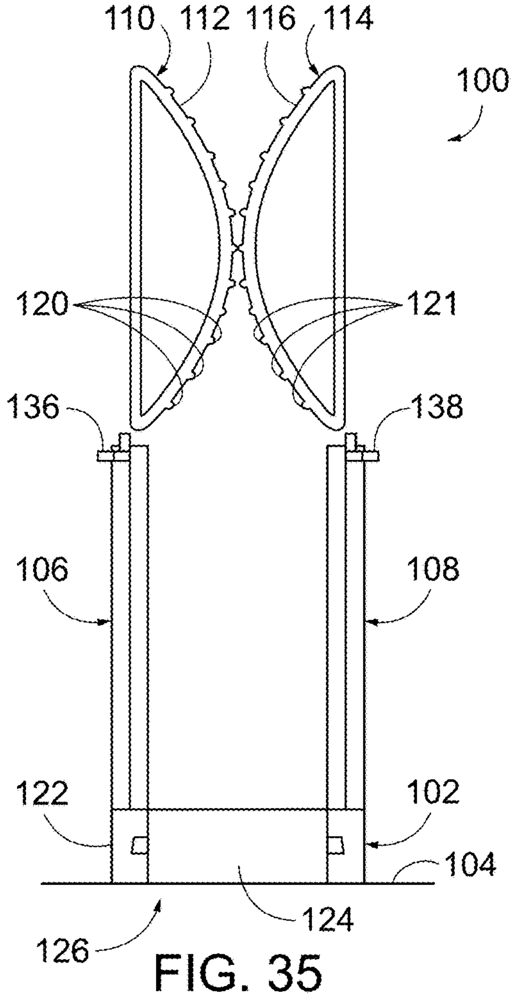
FIG. 35 is a schematic, front view of the retaining fixture of FIG. 33, showing removal of the gripping members, according to one or more examples of the subject matter, disclosed herein.
Figure 36:
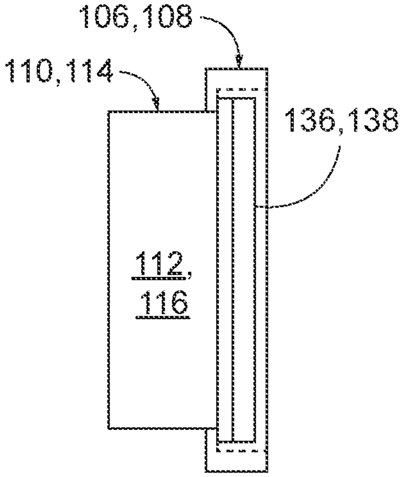
FIG. 36 is a schematic, top view of a portion of the retaining fixture of FIG. 33, showing a latch, retaining a gripping member to an arm of the retaining fixture, according to one or more examples of the subject matter, disclosed herein.
Figure 37:
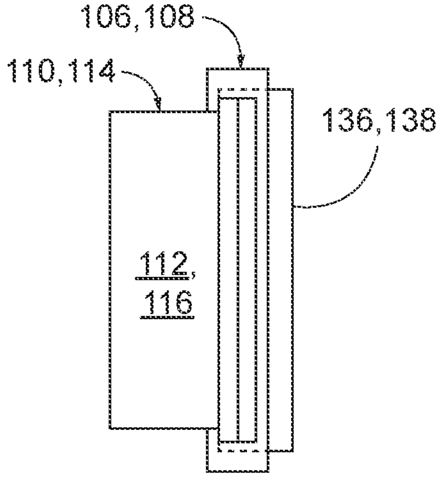
FIG. 37 is a schematic, top view of the portion of the retaining fixture of FIG. 36, showing the latch releasing the gripping member from the arm of the retaining fixture, according to one or more examples of the subject matter, disclosed herein.

Referring generally to FIG. 1 and particularly to, e.g., FIG. 33 for illustrative purposes only and not by way of limitation, the following portion of this paragraph delineates example 14 of the subject matter, disclosed herein. According to example 14, which encompasses any one of examples 1 to 13, above, first arm 106 comprises first-arm body 128 and first-arm pivotal portion 130. First-arm body 128 is coupled to base 102. First-arm pivotal portion 130 is coupled to first-arm body 128 and is pivotable relative to first-arm body 128 about first-arm-body pivot axis 131.

By being pivotal relative to first-arm body 128, first-arm pivotal portion 130 enables a user to select an angle of first-arm pivotal portion 130, such as to direct wire 504 or wire bundle 506 at an angle relative to retaining fixture 100 without wire 504 or wire bundle 506 detrimentally engaging a sharp edge of first arm 106.

In one or more examples, first-arm pivotal portion 130 is configured to be selectively positioned in a predesignated angle, such as (but not limited to) 45 degrees or 90 degrees, relative to first-arm body 128.

Referring generally to FIG. 1 and particularly to, e.g., FIG. 33 for illustrative purposes only and not by way of limitation, the following portion of this paragraph delineates example 15 of the subject matter, disclosed herein. According to example 15, which encompasses example 14, above, second arm 108 comprises second-arm body 132 and second-arm pivotal portion 134. Second-arm body 132 is coupled to base 102. Second-arm pivotal portion 134 is coupled to second-arm body 132 and is pivotable relative to second-arm body 132 about second-arm-body pivot axis 133.

By being pivotal relative to second-arm body 132, second-arm pivotal portion 134 enables a user to select an angle of second-arm pivotal portion 134, such as to direct wire 504 or wire bundle 506 at an angle relative to retaining fixture 100 without wire 504 or wire bundle 506 detrimentally engaging a sharp edge of second arm 108.

In one or more examples, second-arm pivotal portion 134 is configured to be selectively positioned in a predesignated angle, such as (but not limited to) 45 degrees or 90 degrees, relative to second-arm body 132.

Referring generally to FIG. 1 and particularly to, e.g., FIG. 33 for illustrative purposes only and not by way of limitation, the following portion of this paragraph delineates example 16 of the subject matter, disclosed herein. According to example 16, which encompasses example 15, above, first-arm-body pivot axis 131 and second-arm-body pivot axis 133 are parallel to each other.

By having the pivot axes parallel to each other, such as also being parallel to wire-harness board 104, first-arm body 128 and second-arm body 132 enable the guidance of wires in a given plane, such as parallel to wire-harness board 104.

Referring generally to FIG. 1 and particularly to, e.g., FIGS. 34-37 for illustrative purposes only and not by way of limitation, the following portion of this paragraph delineates example 17 of the subject matter, disclosed herein. According to example 17, which encompasses any one of examples 1 to 16, above, first gripping member 110 is decouplable from first arm 106, and second gripping member 114 is decouplable from second arm 108.

Accordingly, the first and second gripping members are easily replaced if damaged. Additionally, in one more examples, the first and second gripping members are interchangeable with differently configured first and second gripping members, such as depending on the size of wire 504 or wire bundle 506 to be retained by retaining fixture 100.

Referring generally to FIG. 1 and particularly to, e.g., FIGS. 34-37 for illustrative purposes only and not by way of limitation, the following portion of this paragraph delineates example 18 of the subject matter, disclosed herein. According to example 18, which encompasses example 17, above, first arm 106 comprises first-arm latch 136, configured to prevent decoupling of first gripping member 110 from first arm 106. Second arm 108 comprises second-arm latch 138, configured to prevent decoupling of second gripping member 114 from second arm 108.

First-arm latch 136 and second-arm latch 138 ensure that first arm 106 and second arm 108 do not inadvertently separate from the first and second arms of retaining fixture 100, such as due to an orientation of wire-harness board 104.

Figure 38:
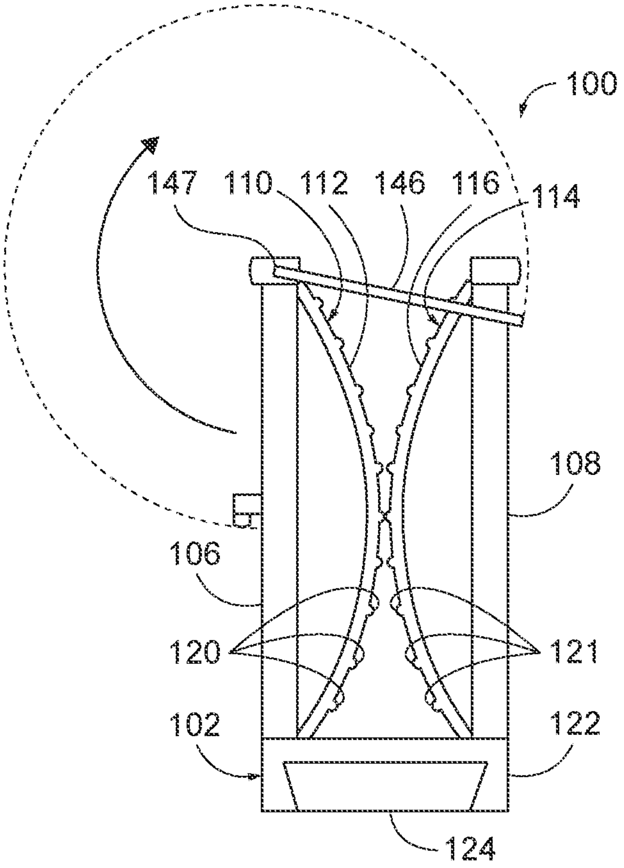
FIG. 38 is a schematic, front view of the retaining fixture of FIG. 1, according to one or more examples of the subject matter, disclosed herein.
Figure 39:
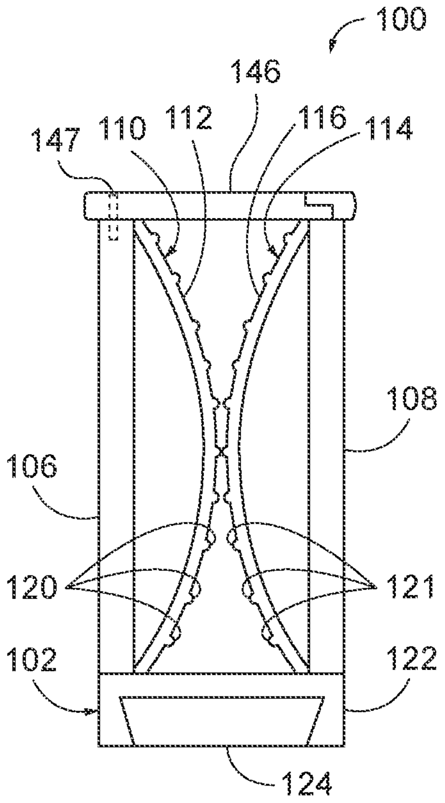
FIG. 39 is a schematic, front view of the retaining fixture of FIG. 1, according to one or more examples of the subject matter, disclosed herein.
Figure 40:
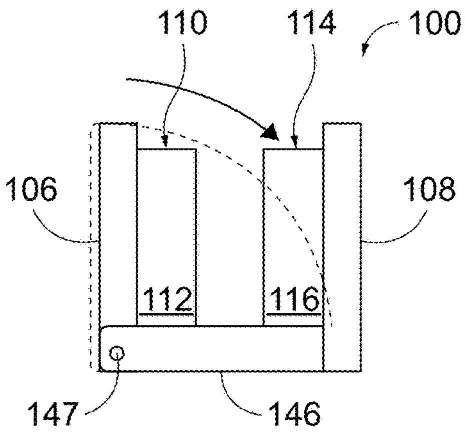
FIG. 40 is a schematic, top view of the retaining fixture of FIG. 39, according to one or more examples of the subject matter, disclosed herein.
Figure 41:
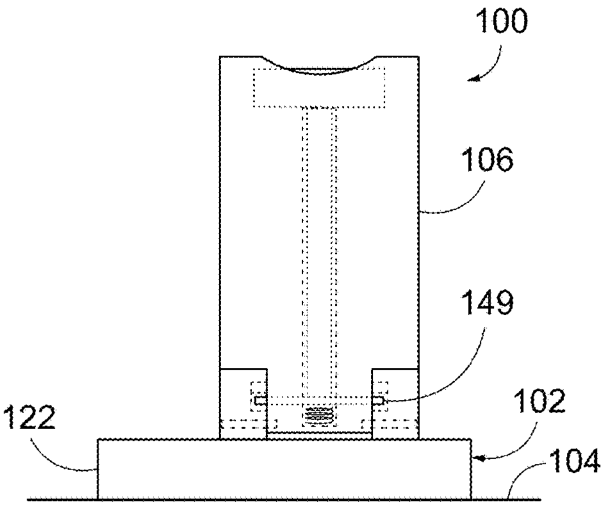
FIG. 41 is a schematic, side view of the retaining fixture of FIG. 1, according to one or more examples of the subject matter, disclosed herein.
Figure 42:
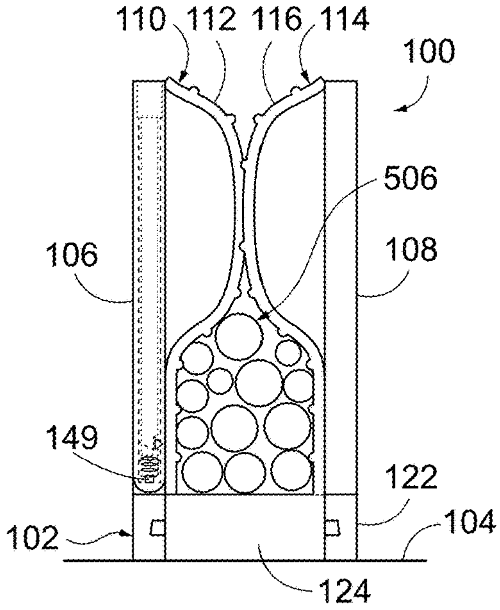
FIG. 42 is a schematic, front view of the retaining fixture of FIG. 41, showing retention of a wire bundle by the retaining fixture, according to one or more examples of the subject matter, disclosed herein.
Figure 43:
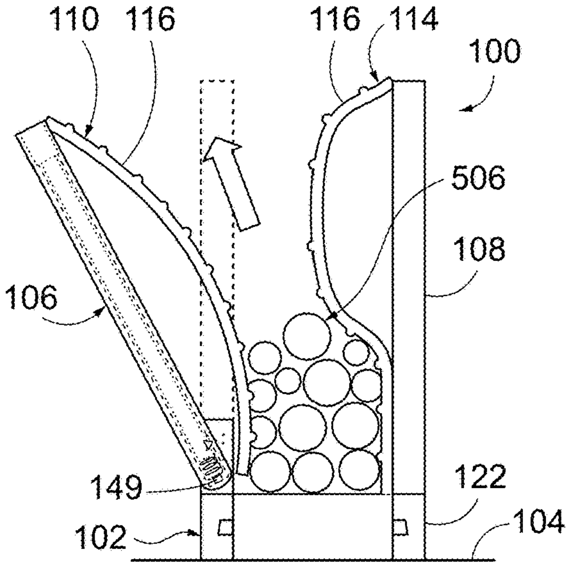
FIG. 43 is a schematic, front view of the retaining fixture of FIG. 41, showing the first arm pivoted away from the second arm to enable withdrawal of a wire bundle, according to one or more examples of the subject matter, disclosed herein.
Figure 44:
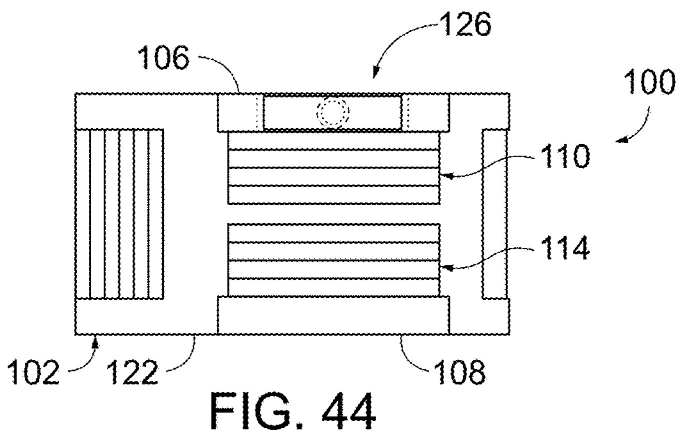
FIG. 44 is a schematic, top view of the retaining fixture of FIG. 41, according to one or more examples of the subject matter, disclosed herein.
Figure 45:
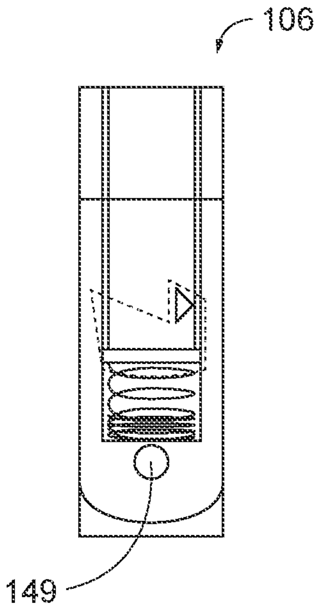
FIG. 45 is a schematic, front view of a portion of the retaining fixture of FIG. 41, showing the first arm in an upright locked position, according to one or more examples of the subject matter, disclosed herein.
Figure 46:
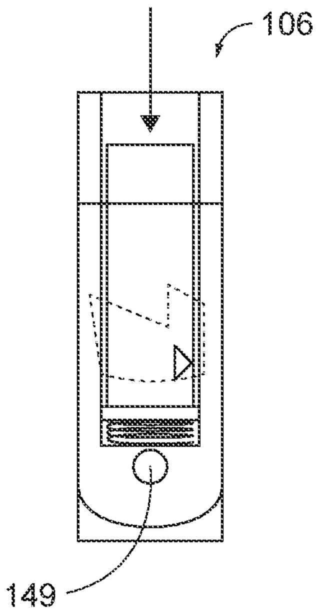
FIG. 46 is a schematic, front view of the portion of the retaining fixture of FIG. 45, showing the first arm in being released for pivoting, according to one or more examples of the subject matter, disclosed herein.
Figure 47:
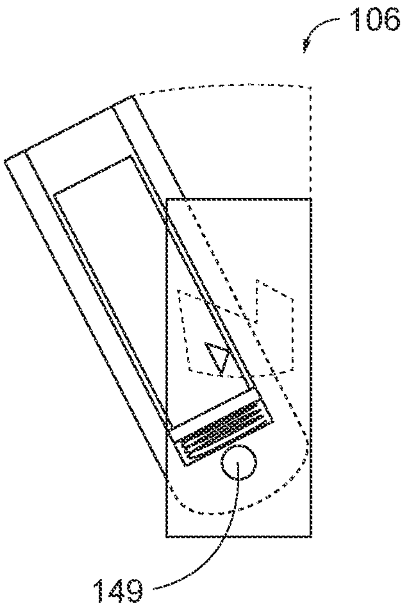
FIG. 47 is a schematic, front view of the portion of the retaining fixture of FIG. 45, showing the first arm being pivoted, according to one or more examples of the subject matter, disclosed herein.
Figure 48:
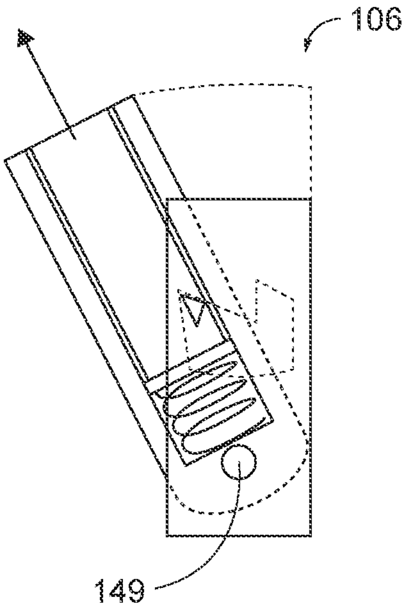
FIG. 48 is a schematic, front view of the portion of the retaining fixture of FIG. 45, showing the first arm in a pivoted locked position, according to one or more examples of the subject matter, disclosed herein.
Figure 49:
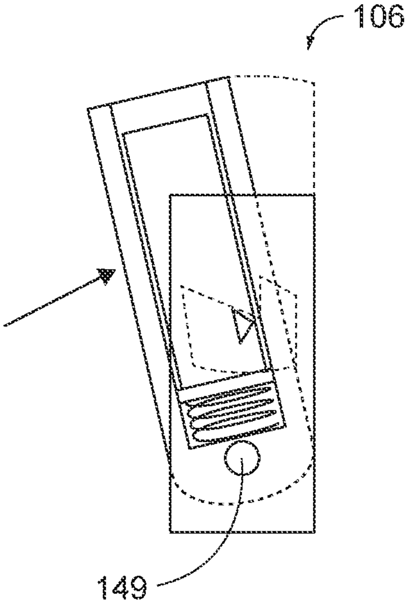
FIG. 49 is a schematic, front view of the portion of the retaining fixture of FIG. 45, showing the first arm being pivoted toward the upright locked position, according to one or more examples of the subject matter, disclosed herein.
Figure 50:
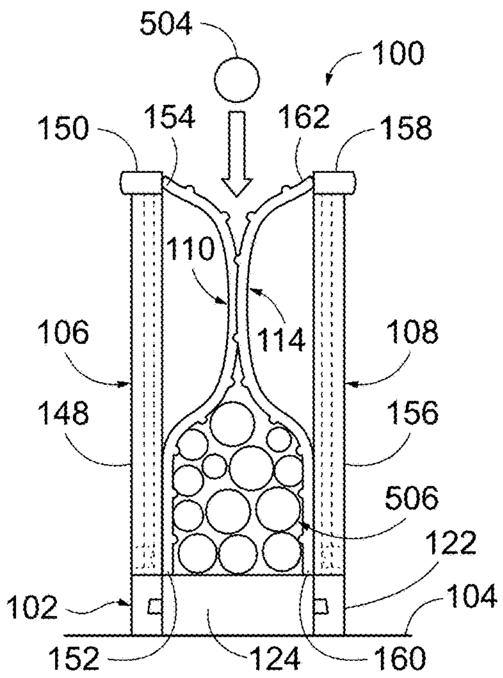
FIG. 50 is a schematic, front view of the retaining fixture of FIG. 1, showing insertion of a wire into and retention of a wire bundle by the retaining fixture, according to one or more examples of the subject matter, disclosed herein.
Figure 51:
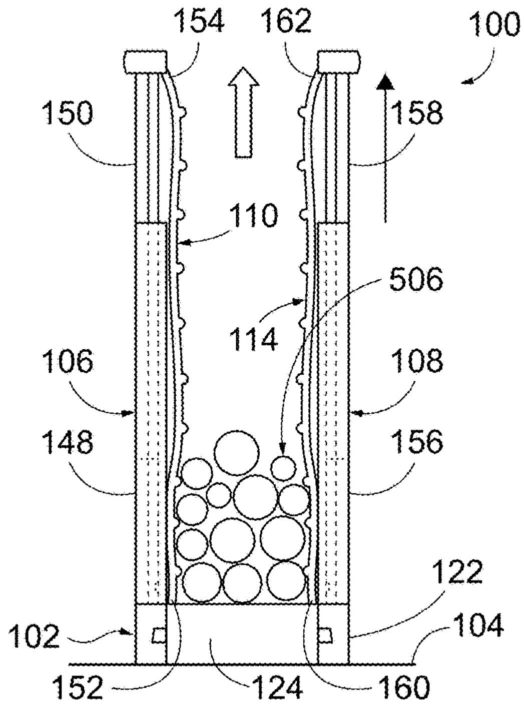
FIG. 51 is a schematic, front view of the retaining fixture of FIG. 50, showing translation of the first-arm sliding portion and the second-arm sliding portion to enable withdrawal of a wire bundle from the retaining fixture, according to one or more examples of the subject matter, disclosed herein.
Figure 52:
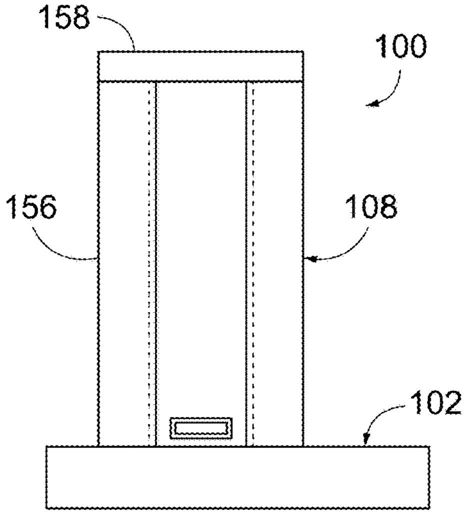
FIG. 52 is a schematic, side view of the retaining fixture of FIG. 50, according to one or more examples of the subject matter, disclosed herein.
Figure 53:
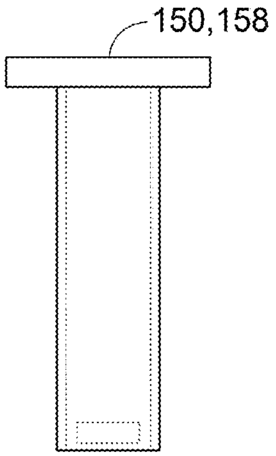
FIG. 53 is a schematic, side view of a sliding portion of an arm of the retaining fixture of FIG. 50, according to one or more examples of the subject matter, disclosed herein.
Figure 54:
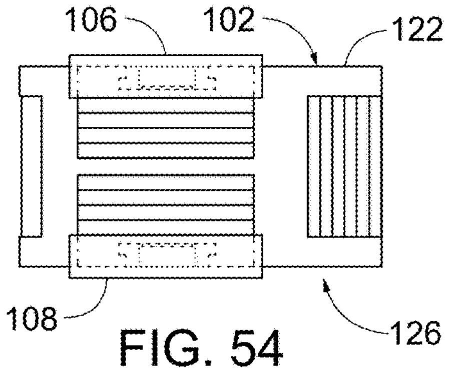
FIG. 54 is a schematic, top view of the retaining fixture of FIG. 50, according to one or more examples of the subject matter, disclosed herein.
Figure 55:
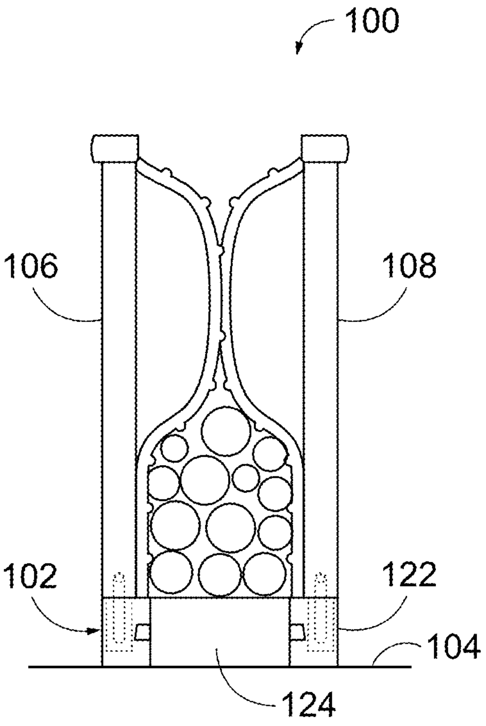
FIG. 55 is a schematic, front view of the retaining fixture of FIG. 1, showing retention of a wire bundle by the retaining fixture, according to one or more examples of the subject matter, disclosed herein.
Figure 56:
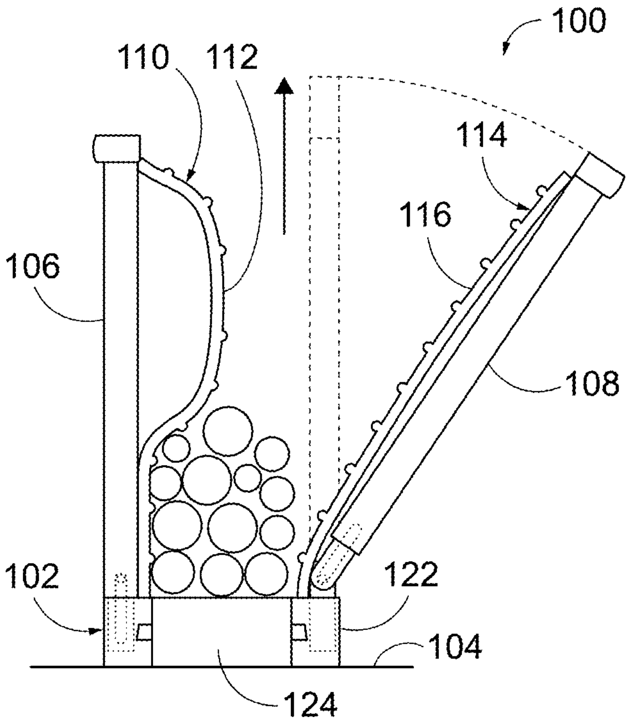
FIG. 56 is a schematic, front view of the retaining fixture of FIG. 55, showing the second arm being pivoted away from the first arm to enable withdrawal of a wire bundle from the retaining fixture, according to one or more examples of the subject matter, disclosed herein.
Figure 57:
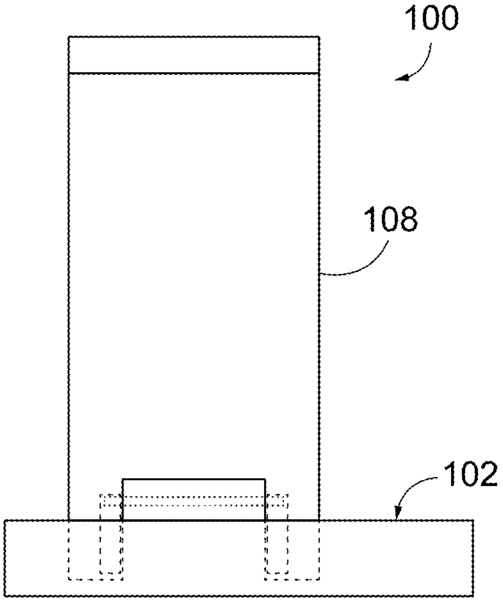
FIG. 57 is a schematic, side view of the retaining fixture of FIG. 55, according to one or more examples of the subject matter, disclosed herein.
Figure 58:
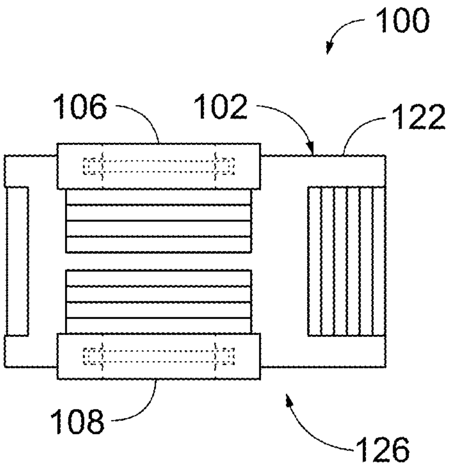
FIG. 58 is a schematic, top view of the retaining fixture of FIG. 55, according to one or more examples of the subject matter, disclosed herein.
Figure 59:
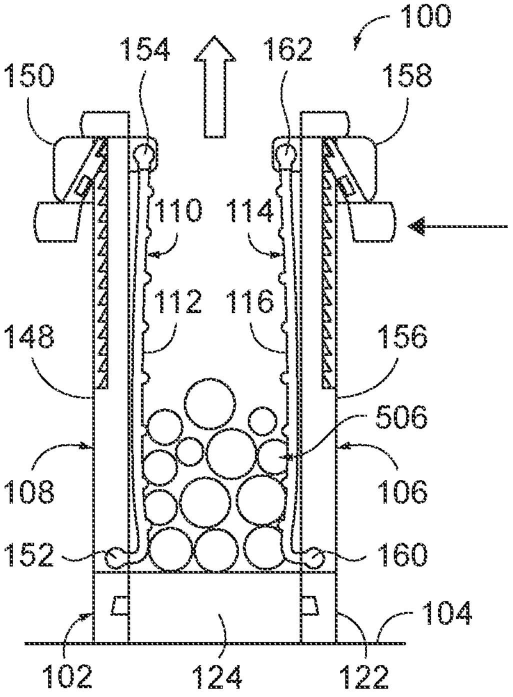
FIG. 59 is a schematic, front view of the retaining fixture of FIG. 1, configured for withdrawal of a wire bundle from the retaining fixture, according to one or more examples of the subject matter, disclosed herein.
Figure 60:
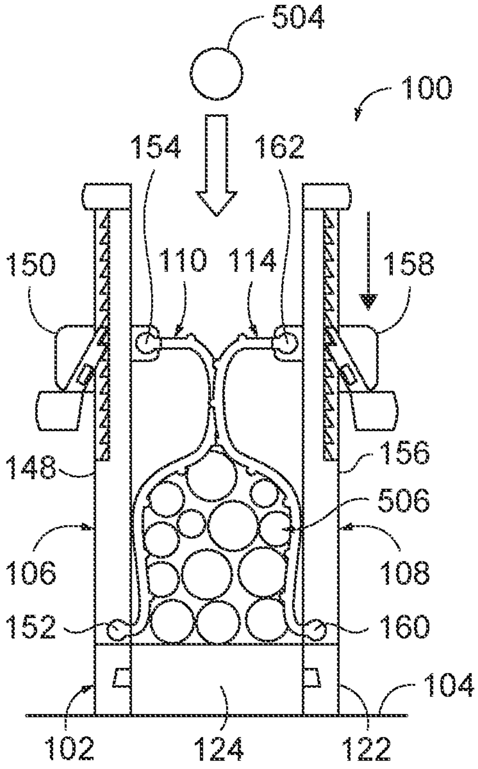
FIG. 60 is a schematic, front view of the retaining fixture of FIG. 59, configured for retention of a wire bundle by the retaining fixture, according to one or more examples of the subject matter, disclosed herein.
Figure 61:
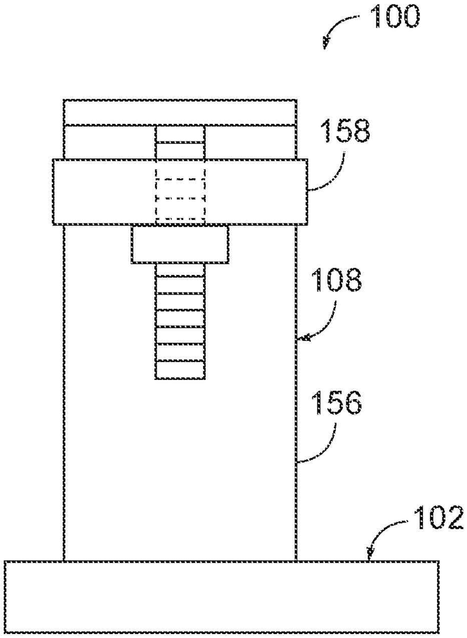
FIG. 61 is a schematic, side view of the retaining fixture of FIG. 59, according to one or more examples of the subject matter, disclosed herein.
Figure 62:
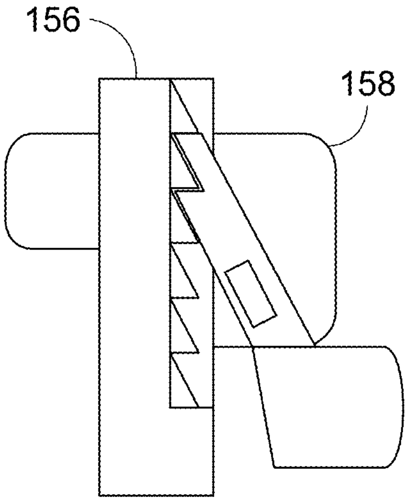
FIG. 62 is a schematic, side view of a portion of the retaining fixture of FIG. 59, according to one or more examples of the subject matter, disclosed herein.
Figure 63:
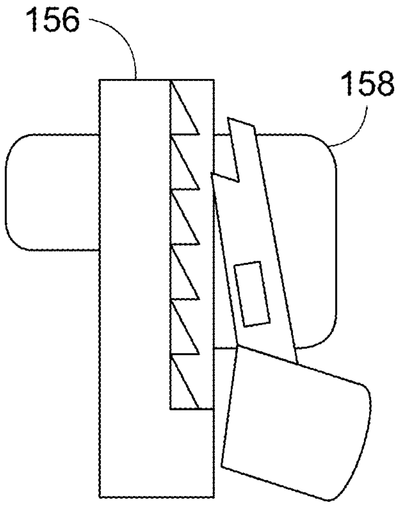
FIG. 63 is a schematic, side view of the portion of the retaining fixture of FIG. 62, according to one or more examples of the subject matter, disclosed herein.
Figure 64:
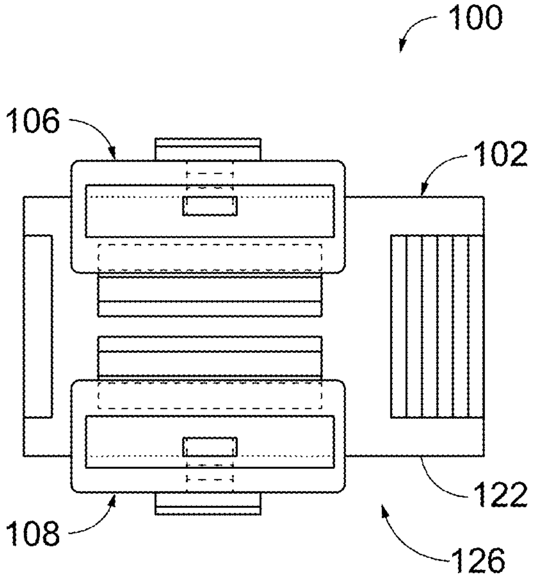
FIG. 64 is a schematic, top view of the retaining fixture of FIG. 59, according to one or more examples of the subject matter, disclosed herein.

Referring generally to FIG. 1 and particularly to, e.g., FIGS. 38-40 for illustrative purposes only and not by way of limitation, the following portion of this paragraph delineates example 19 of the subject matter, disclosed herein. According to example 19, which encompasses anyone of examples 1 to 18, above, retaining fixture 100 further comprises clip 146, coupled to first arm 106 and pivotable relative to first arm 106 about clip axis 147. Clip 146 is configured to engage second arm 108.

Clip 146 selectively retains wire 504 or wire bundle 506 between first arm 106 and second arm 108, while also permitting selective insertion of wire 504 or wire bundle 506 between first arm 106 and second arm 108 and/or removal of wire 504 or wire bundle 506 from between first arm 106 and second arm 108.

Referring generally to FIG. 1 and particularly to, e.g., FIG. 38 for illustrative purposes only and not by way of limitation, the following portion of this paragraph delineates example 20 of the subject matter, disclosed herein. According to example 20, which encompasses example 19, above, clip axis 147 is parallel to base 102.

Accordingly, in one or more examples, clip 146, when opened, does not restrict placement of wire 504 or wire bundle 506 into or out of retaining fixture 100. Also, in one or more examples, clip 146, when opened, does not interfere or engage with an adjacent retaining fixture depending on the location of an adjacent retaining fixture being utilized.

Referring generally to FIG. 1 and particularly to, e.g., FIGS. 39 and 40 for illustrative purposes only and not by way of limitation, the following portion of this paragraph delineates example 21 of the subject matter, disclosed herein. According to example 21, which encompasses example 19, above, clip axis 147 is perpendicular to base 102.

Accordingly, in one or more examples, clip 146, when opened, does not restrict placement of wire 504 or wire bundle 506 into or out of retaining fixture 100. Also, in one or more examples, clip 146, when opened, does not interfere or engage with an adjacent retaining fixture depending on the location of an adjacent retaining fixture being utilized.

Referring generally to FIG. 1 and particularly to, e.g., FIGS. 41 to 49 and 55 to 58 for illustrative purposes only and not by way of limitation, the following portion of this paragraph delineates example 22 of the subject matter, disclosed herein. According to example 22, which encompasses any one of examples 1 to 21, above, first arm 106 is coupled to base 102 and is pivotable relative to base 102 about first-arm axis 149 that is parallel to base 102.

Once wire harness 502 is fully assembled with wire bundle 506 having a cross-sectional area that otherwise makes removal of wire bundle 506 from between first arm 106 and second arm 108 difficult, first arm 106 is pivoted away from second arm 108 to enable easy removal of wire bundle 506 from retaining fixture 100.

In one or more examples, second arm 108 is similarly configured.

Referring generally to FIG. 1 and particularly to, e.g., FIGS. 41 to 49 and 55 to 58 for illustrative purposes only and not by way of limitation, the following portion of this paragraph delineates example 23 of the subject matter, disclosed herein. According to example 23, which encompasses example 22, above, first arm 106 is lockable relative to base 102.

First arm 106 locks so that it does not inadvertently pivot away from second arm 108 and thereby inadvertently release wire bundle 506 from retaining fixture 100.

In one or more examples, second arm 108 is similarly configured.

Referring generally to FIG. 1 and particularly to, e.g., FIGS. 50 to 54 and 59 to 64 for illustrative purposes only and not by way of limitation, the following portion of this paragraph delineates example 24 of the subject matter, disclosed herein. According to example 24, which encompasses any one of examples 1 to 23, above, first arm 106 comprises first-arm base portion 148 and first-arm sliding portion 150. First-arm base portion 148 is coupled to base 102. First-arm sliding portion 150 is coupled to first-arm base portion 148 and is translatable relative to first-arm base portion 148 and base 102.

Accordingly, translation of first-arm sliding portion 150 permits for selective removal of wire bundle 506 from retaining fixture 100 without first-arm sliding portion 150 being pivoted and potentially interfering with adjacent retaining fixtures or adjacent portions of wire harness 502.

Referring generally to FIG. 1 and particularly to, e.g., FIGS. 50, 51, 59, and 60 for illustrative purposes only and not by way of limitation, the following portion of this paragraph delineates example 25 of the subject matter, disclosed herein. According to example 25, which encompasses example 24, above, first gripping member 110 comprises first-gripping-member first end 152 and first-gripping-member second end 154. First-gripping-member first end 152 is coupled to first-arm base portion 148, and first-gripping-member second end 154 is coupled to first-arm sliding portion 150.

When first-arm sliding portion 150 is translated away from base 102, first-gripping-member surface 112 will translate away from second second-gripping-member surface 116 and enable easy removal of wire bundle 506 from retaining fixture 100.

Referring generally to FIG. 1 and particularly to, e.g., FIGS. 50 to 54 and 59 to 64 for illustrative purposes only and not by way of limitation, the following portion of this paragraph delineates example 26 of the subject matter, disclosed herein. According to example 26, which encompasses any one of examples 1 to 25, above, second arm 108 comprises second-arm base portion 156 and second-arm sliding portion 158. Second-arm base portion 156 is coupled to base 102. Second-arm sliding portion 158 is coupled to second-arm base portion 156 and is translatable relative to second-arm base portion 156 and base 102.

Accordingly, translation of second-arm sliding portion 158 permits for selective removal of wire bundle 506 from retaining fixture 100 without second-arm sliding portion 158 being pivoted and potentially interfering with adjacent retaining fixtures or adjacent portions of wire harness 502.

Referring generally to FIG. 1 and particularly to, e.g., FIGS. 50, 51, 59, and 60 for illustrative purposes only and not by way of limitation, the following portion of this paragraph delineates example 27 of the subject matter, disclosed herein. According to example 27, which encompasses example 26, above, second gripping member 114 comprises second-gripping-member first end 160 and second-gripping-member second end 162. Second-gripping-member first end 160 is coupled to second-arm base portion 156, and second-gripping-member second end 162 is coupled to second-arm sliding portion 158.

When second-arm sliding portion 158 is translated away from base 102, second-gripping-member surface 116 will translate away from first second-gripping-member surface 112 and enable easy removal of wire bundle 506 from retaining fixture 100.

Referring generally to FIG. 1 and particularly to, e.g., FIGS. 65-69 for illustrative purposes only and not by way of limitation, the following portion of this paragraph delineates example 28 of the subject matter, disclosed herein. According to example 28, which encompasses any one of examples 1 to 27, above, first gripping member 110 comprises first-gripping-member first portion 168 and first-gripping-member second portion 170, spaced apart from first-gripping-member first portion 168. A portion of second gripping member 114 extends between first-gripping-member first portion 168 and first-gripping-member second portion 170.

Accordingly, the gripping members at least partially overlap each other, which facilitates the secure retention of wire 504 or wire bundle 506 within retaining fixture 100.

Referring generally to FIG. 1 and particularly to, e.g., FIGS. 65-69 for illustrative purposes only and not by way of limitation, the following portion of this paragraph delineates example 29 of the subject matter, disclosed herein. According to example 29, which encompasses any one of examples 1 to 28, above, second gripping member 114 comprises second-gripping-member first portion 172 and second-gripping-member second portion 174, spaced apart from second-gripping-member first portion 172. A portion of first gripping member 110 extends between second-gripping-member first portion 172 and second-gripping-member second portion 174.

Accordingly, the gripping members at least partially overlap each other, which facilitates the secure retention of wire 504 or wire bundle 506 within retaining fixture 100.

Referring generally to FIG. 1 and particularly to, e.g., FIGS. 66-82 for illustrative purposes only and not by way of limitation, the following portion of this paragraph delineates example 30 of the subject matter, disclosed herein. According to example 30, which encompasses example 28 or 29, above, retaining fixture 100 further comprises lock pin 164. First gripping member 110 and second gripping member 114 overlap each other sufficiently to form circumferentially closed space 166, defined by overlapping portions of first gripping member 110 and second gripping member 114. Circumferentially closed space (166) is sized to receive the lock pin (164).

Accordingly, when lock pin 164 is positioned within circumferentially closed space 166, wire 504 or wire bundle 506 is prevented from being removed from retaining fixture 100.

In one or more examples, circumferential closed space 166 is defined by observation of retaining fixture in a front elevation view.

Figure 2:
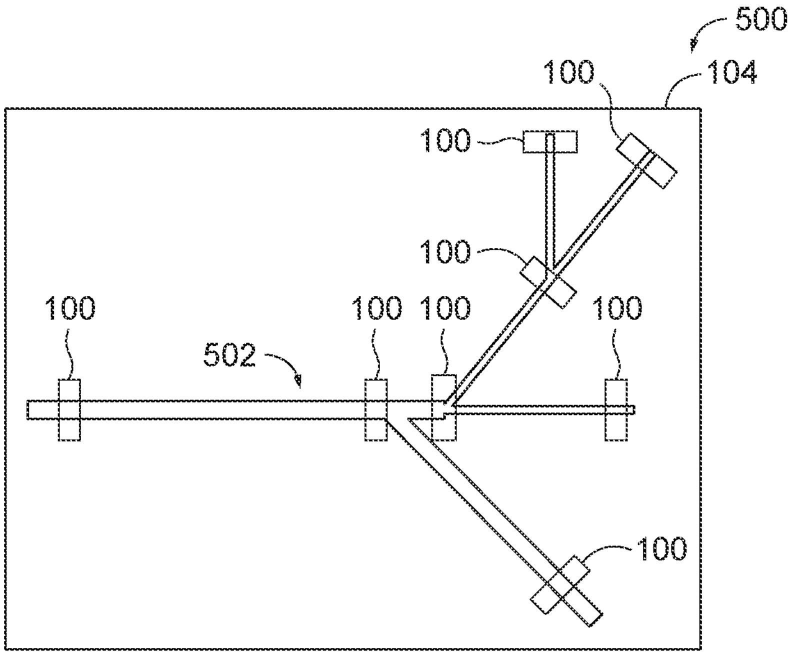
FIG. 2 is a schematic, plan view of the system of FIG. 1, comprising a plurality of retaining fixtures and shown with a wire harness being made, according to one or more examples of the subject matter, disclosed herein.

Referring generally to FIGS. 1 and 2, the following portion of this paragraph delineates example 31 of the subject matter, disclosed herein. According to example 31, system 500 for making wire harness 502 comprises wire-harness board 104 and retaining fixture 100, coupled to wire-harness board 104. Retaining fixture 100 comprises base 102, first arm 106, second arm 108, first gripping member 110, and second gripping member 114. Base 102 is attached to wire-harness board 104. First arm 106 extends from base 102. Second arm 108 extends from base 102. First gripping member 110 is coupled to first arm 106 and comprises first-gripping-member surface 112 that is convex toward second arm 108. Second gripping member 114 is coupled to second arm 108 and comprises second-gripping-member surface 116 that is convex toward first arm 106. First gripping member 110 and second gripping member 114 are resiliently deformable.

Base 102 provides structure for attaching retaining fixture 100 to wire-harness board 104. Accordingly, a plurality of retaining fixtures can be selectively attached and positioned appropriately on wire-harness board 104 for assembly of wire harness 502, as illustrated, e.g., in FIG. 2. Base 102 also supports first arm 106 and second arm 108, which respectively support first gripping member 110 and second gripping member 114. Because the first and second gripping members are resilient, and because first-gripping-member surface 112 and second-gripping-member surface 116 respectively are convex toward second arm 108 and first arm 106, wire 504 or wire bundle 506 is easily engaged with first-gripping-member surface 112 and second-gripping-member surface 116 and translated toward base 102 to be captured and retained by retaining fixture 100. In one or more examples, wire 504 or wire bundle 506 is retained directly between first-gripping-member surface 112 and second-gripping-member surface 116. In one or more examples, wire 504 or wire bundle 506 is retained between first-gripping-member surface 112, second-gripping-member surface 116, and base 102. Because the first and second gripping members are resilient, they automatically urge first-gripping-member surface 112 and second-gripping-member surface 116 respectively toward second arm 108 and first arm 106 to provide a frictional engagement with wire 504 or wire bundle 506 that is positioned between the first and second gripping members.

In one or more examples, base 102 is coupled to wire-harness board 104 directly on the routing path of wire harness 502, resulting in wire routing having improved accuracy. This is in contrast to traditional routing pegs, which are mounted adjacent to the wire-harness routing path.

In one or more examples, retaining fixture 100 of system 500 comprises subject matter of any one of examples 2 to 29, above. In one or more examples, system 500 comprises a plurality of retaining fixtures. In one or more such examples, the plurality of retaining fixtures comprises retaining fixtures, having different configurations.

In one or more examples, second portion 124 of base 102 can remain coupled to wire-harness board 104 without the remainder of retaining fixture 100, such as for storage of wire-harness board 104, resulting in a lower profile than that of traditional wire-harness boards with routing pegs that extend ten or more centimeters from the surface of a wire-harness board.

In one or more examples, second portion 124 can be inset, or embedded, within wire-harness board 104, such that second portion 124 does not extend beyond, or only minimally extends beyond, the surface of wire-harness board 104. This results in a low-profile wire-harness board, which is easier to store.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus (es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

The invention claimed is:

1. A retaining fixture for attachment to a wire-harness board, the retaining fixture comprising:
- a base;
- a first arm, extending from the base;
- a second arm, extending from the base;
- a first gripping member comprising:
  - a first-gripping-member first end, coupled to the first arm;
  - a first-gripping-member second end opposite the first-gripping-member first end and coupled to the first arm; and
  - a first-gripping-member surface that is convex toward the second arm from the first-gripping-member first end to the first-gripping-member second end; and
- a second gripping member comprising:
  - a second-gripping-member first end, coupled to the second arm;
  - a second-gripping-member second end opposite the second-gripping-member first end and coupled to the second arm; and
  - a second-gripping-member surface that is convex toward the first arm from the second-gripping-member first end to the second-gripping-member second end,
- wherein the first gripping member and the second gripping member are resiliently deformable.

2. The retaining fixture according to claim 1, wherein the base, the first-gripping-member surface, and the second-gripping-member surface collectively define at least a portion of a closed shape.

3. The retaining fixture according to claim 1, wherein:
- the first-gripping-member surface comprises a first plurality of projections, and
- the second-gripping-member surface comprises a second plurality of projections.

4. The retaining fixture according to claim 3, wherein:
- at least one of the first plurality of projections is angled toward the base, and
- at least one of the second plurality of projections is angled toward the base.

5. The retaining fixture according to claim 1, further comprising a platform, extending between the first arm and the second arm, wherein the platform is biased away from the base.

6. The retaining fixture according to claim 5, further comprising a third gripping member, coupled to the platform, wherein:
- the third gripping member comprises a third-gripping-member surface that is convex away from the base, and
- the third gripping member is resiliently deformable.

7. The retaining fixture according to claim 1, further comprising a third gripping member, coupled to the base, wherein:
- the third gripping member comprises a third-gripping-member surface that is convex away from the base, and
- the third gripping member is resiliently deformable.

8. The retaining fixture according to claim 1, wherein the base comprises:
- a first portion, coupled to the first arm and the second arm; and
- a second portion, releasably coupled to the first portion.

9. The retaining fixture according to claim 8, wherein the base further comprises a base latch, configured to secure the first portion of the base to the second portion of the base.

10. The retaining fixture according to claim 1, wherein the first arm comprises:
- a first-arm body, coupled to the base; and
- a first-arm pivotal portion, coupled to the first-arm body and pivotable relative to the first-arm body about a first-arm-body pivot axis.

11. The retaining fixture according to claim 10, wherein the second arm comprises:
- a second-arm body, coupled to the base; and
- a second-arm pivotal portion, coupled to the second-arm body and pivotable relative to the second-arm body about a second-arm-body pivot axis.

12. The retaining fixture according to claim 1, wherein:
- the first gripping member is decouplable from the first arm; and
- the second gripping member is decouplable from the second arm.

13. The retaining fixture according to claim 12, wherein:
- the first arm comprises a first-arm latch, configured to prevent decoupling of the first gripping member from the first arm; and
- the second arm comprises a second-arm latch, configured to prevent decoupling of the second gripping member from the second arm.

14. The retaining fixture according to claim 1, further comprising a clip, coupled to the first arm and pivotable relative to the first arm about a clip axis, wherein the clip is configured to engage the second arm.

15. The retaining fixture according to claim 1, wherein the first arm comprises:
- a first-arm base portion, coupled to the base; and
- a first-arm sliding portion, coupled to the first-arm base portion and translatable relative to the first-arm base portion and the base.

16. The retaining fixture according to claim 15, wherein:
- the first-gripping-member first end is coupled to the first-arm base portion; and
- the first-gripping-member second end is coupled to the first-arm sliding portion.

17. The retaining fixture according to claim 1, wherein the second arm comprises:
- a second-arm base portion, coupled to the base; and
- a second-arm sliding portion, coupled to the second-arm base portion and translatable relative to the second-arm base portion and the base.

18. The retaining fixture according to claim 17, wherein:
- the second-gripping-member first end is coupled to the second-arm base portion; and
- the second-gripping-member second end is coupled to the second-arm sliding portion.

19. The retaining fixture according to claim 1, wherein:

the first gripping member comprises a first-gripping-member first portion and a first-gripping-member second portion, spaced apart from the first-gripping-member first portion; and a portion of the second gripping member extends between the first-gripping-member first portion and the first-gripping-member second portion.

20. A system for making a wire harness, the system comprising:

a wire-harness board; and the retaining fixture according to claim 1.

* * * * *